(12) United States Patent
Ooyama

(10) Patent No.: US 8,186,334 B2
(45) Date of Patent: May 29, 2012

(54) 6-CYCLE ENGINE WITH REGENERATOR

(76) Inventor: Kazuo Ooyama, Tokyo (JP)

( * ) Notice: Subject to any disclaimer, the term of this patent is extended or adjusted under 35 U.S.C. 154(b) by 665 days.

(21) Appl. No.: 12/377,861

(22) PCT Filed: Aug. 6, 2007

(86) PCT No.: PCT/JP2007/065334
§ 371 (c)(1),
(2), (4) Date: Feb. 18, 2009

(87) PCT Pub. No.: WO2008/020550
PCT Pub. Date: Feb. 21, 2008

(65) Prior Publication Data
US 2010/0050963 A1 Mar. 4, 2010

(30) Foreign Application Priority Data
Aug. 18, 2006 (JP) ................. 2006-248694

(51) Int. Cl.
| F02M 25/07 | (2006.01) |
| F02B 47/08 | (2006.01) |
| F02B 33/44 | (2006.01) |
| F02B 75/02 | (2006.01) |
| F01N 3/18 | (2006.01) |
| F01N 3/36 | (2006.01) |

(52) U.S. Cl. ........... 123/568.12; 123/64; 123/568.14; 123/90.15; 60/278; 60/286; 60/605.2

(58) Field of Classification Search ............ 123/21, 123/58.8, 64, 90.15–90.18, 347, 348, 543, 123/568.11, 568.12, 568.14; 60/302, 602, 60/606–608, 712, 274, 278, 282, 286, 303
See application file for complete search history.

(56) References Cited

U.S. PATENT DOCUMENTS

| 4,513,568 A | 4/1985 | Bajulaz |
| 4,917,054 A * | 4/1990 | Schmitz ................. 123/58.8 |
| 4,924,820 A * | 5/1990 | Lear et al. ............... 60/302 |

(Continued)

FOREIGN PATENT DOCUMENTS

| JP | 61-212632 | 9/1986 |
| JP | 63-215808 | 9/1988 |
| JP | 2-96435 | 8/1990 |

OTHER PUBLICATIONS

Japanese Patent Office, International Preliminary Report on Patentability for International Application No. PCT/JP2007/065334, Aug. 8, 2008.

(Continued)

*Primary Examiner* — Willis Wolfe, Jr.
(74) *Attorney, Agent, or Firm* — Sherr & Vaughn, PLLC

(57) ABSTRACT

In an attempt to regenerate energy of exhaust gas by using a pressure regenerator secured to an exhaust port of a displacement type engine so as to realize the Atkinson's cycle, if the engine is a four-cycle engine, raising regenerative pressure may cause abnormal fuel combustion or melting damage of an exhaust valve. The present invention has successfully solved this problem by using a six-cycle engine. The six-cycle engine with a regenerator according to the present invention is capable of varying proportion of the power output that is generated by the six-cycle engine itself and that is generated by the regenerator. Using this principle enables the six-cycle engine with a generator to be used as an engine that is capable of generating two kinds of output power or as a six-cycle gas turbine with high controllability. The invented internal combustion engine is excellent and valuable in the fuel cost economy when it is used as a motor for a power station and a small generator as well as a motor for a movable body such as a ship or a vehicle. The invented internal combustion engine is especially suitable for a movable body such as a hybrid-system vehicle. Incidentally, the inventor is ready for granting the rights for practicing the present invention.

17 Claims, 7 Drawing Sheets

U.S. PATENT DOCUMENTS

| | | | | |
|---|---|---|---|---|
| 5,699,758 A | * | 12/1997 | Clarke | 123/64 |
| 6,253,745 B1 | * | 7/2001 | Prater | 123/543 |
| 6,758,170 B1 | * | 7/2004 | Walden | 123/21 |
| 2010/0083921 A1 | * | 4/2010 | Ooyama | 123/64 |

OTHER PUBLICATIONS

Japanese Patent Office, International Search Report for International Application No. PCT/JP2007/065334, Nov. 20, 2007.

* cited by examiner

6-CYCLE ENGINE WITH REGENERATOR

This application is the U.S. National Phase under 35 U.S.C. §371 of International Application PCT Patent Application No. PCT/JP2007/065334, filed on Aug. 6, 2007, which claims priority to Japanese Patent Application No. 2006-248694, filed on Aug. 18, 2006; the contents of which are all herein incorporated by this reference in their entireties. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

TECHNICAL FIELD

The present invention relates to a combined cycle internal combustion engine and its use that aim at improving fuel cost saving by configuring a displacement type internal combustion engine as a six-cycle engine equipped with a regenerator.

BACKGROUND ART

It is known from old days that there has been a system that extracts power from a displacement type engine to the outside of the engine by installing a displacement type motor or an exhaust turbine capable of converting pressure energy remained in exhaust gas into rotating power to an exhaust port of a displacement type engine. As shown in a reference Japanese Patent document 1 for example, there is a recent proposal on a regenerating device that is provided with a valve for adjusting flow rate of introduced gas by configuring a regenerator as a volume expanding device. However, the reference document 1 does not mention any displacement type engine suitable for installing a regenerator. Henceforth, such a device that converts pressure energy remained in exhaust into power is referred to as a regenerator, whereas the pressure at an exhaust port that is equal to the pressure at the inlet of the above regenerator is referred to as regenerating pressure.

Although not generally used, as shown in a reference Japanese Patent document 2 for example, such an internal combustion engine that completes one cycle via six strokes comprising (1) suction, (2) compression, (3) explosion/expansion, (4) exhaust, (5) introduction of scavenging air, and (6) scavenging air exhausting stroke, is known as a scavenging engine. Of these, such a conventional scavenging engine that is equipped with one exhaust port cited in this document is referred to as a six-cycle engine hereinafter.

As cited in a reference Japanese Patent document 3 for example, it is known that there is an engine that is equipped with an exhaust turbine functioning as a regenerator provided for a six-cycle diesel engine that uses (5) a water-injecting and expanding stroke for the fifth stroke instead of using (5) introduction of scavenging air. However, as cited in FIG. 2 of the reference Japanese Patent document 3, the pressure at the exhaust port is equivalent to the pressure at the suction port, and yet, there is neither any description nor suggestion on a mechanism that regenerates more substantial pressure energy from exhaust gas by increasing the regenerated pressure.

It is known that there is a "free-piston type gas turbine" called "Pescara Cycle", which is a gas turbine engine using a reciprocating piston engine as a combustion chamber. A reciprocating piston engine is a kind of displacement-type internal combustion engines.

As cited in a reference Japanese Patent document 4 for example, it is also known that there is a system which initially causes angle of vane constituting a nozzle of an exhaust turbine to vary continuously, and then causes aperture area of a turbine nozzle to be varied and further causes area of gas passage to be varied, thereby enabling the system to be adapted to variable gas volume. A gas turbine with variable number of nozzles has been disclosed in a patent application that is utilized for the basis for the claim of priority in the present application for a Japanese patent.

In terms of a hybrid vehicle, it is known that there is a series hybrid vehicle which initially converts all power output from an internal combustion engine into electric power and then drives a vehicle driving motor to make the series hybrid vehicle run. As cited in a reference Japanese Patent document 5 for example, it is also known that there is a parallel hybrid vehicle which is driven not only by power output from an internal combustion engine via a transmission, but also driven by a motor with power from a battery by directly linking the motor to an output shaft of the internal combustion engine.

Further, as cited in a reference Japanese Patent document 6 for example, it is also known that there is a hybrid vehicle which initially distributes power output from an internal combustion engine via a planetary gear, and then drives the hybrid vehicle with a portion of the output power and simultaneously drives a generator that concurrently serves as a motor by applying remaining power to generate electric power. Said vehicle further utilizes a torque distribution system using a couple of motors capable of driving another motor connected to driving wheels by applying the generated power and the battery power and further using planetary gears, thereby the above-cited hybrid vehicle incorporates both characteristics of the series type and the parallel type.

REFERENCE JAPANESE PATENT DOCUMENTS 1-6

1: Japanese Patent Publication No. 3739725
2: Japanese Utility Model Publication HEISEI-2-96435/1965
3: Japanese Patent Publication No. 2819676
4: Laid-Open Japanese Patent Application Publication No. 2001-12252, FIG. 2
5: Japanese Patent Publication No. 2857666
6: Japanese Patent Publication No. 2006-22890

DISCLOSURE OF THE INVENTION

Problems to be solved by the Invention

In any of conventional four-stroke engines, expansion ratio of combusted gas is determined by the compression ratio. Suction air is adiabatically compressed during a compression stroke. Since the compressed air is then combusted in the temperature-raised condition and then converted into driving force via an expansion that occurred during an explosion/expansion stroke by an extent corresponding to the compression ratio, the exhaust valve opens itself while the internal pressure still remains higher than the external pressure, thus causing energy of exhaust gas to be released into atmosphere.

Basically, the inventive concept on an internal combustion engine having an expansion ratio greater than the compression ratio for making use of the pressure energy described above is known from old times as the concept on the Atkinson cycle. On the other hand, the Miller cycle intends to apply the above concept to any of conventional four-stroke engines by way of varying the timing of the suction valve. However, any of the above conventional engines has problem to solve due to decreasing output when those engines cited above use an identical displacement, and yet, as another problem, due to invariable friction caused by reciprocating movement, friction ratio against the output power increases.

In any of the four-stroke engines, when securing a high regenerative pressure with provision of a regenerator so as to improve cycle efficiency, it causes critical problems such as abnormal fuel combustion or melting of the exhaust valve to occur. While the regenerative pressure remains low, exhaust gas after opening the exhaust valve is led to the exhaust port. This makes the exhaust gas remaining in cylinders adiabatically expand and gas temperature lowers to some extent. Conversely, when the regenerative pressure remains high, since the regenerative pressure is not lowered even when the exhaust valve opens, as piston travels in an upward direction, exhaust gas held at a high degree of temperature is led to the exhaust port. Due to this reason, the exhaust valve that missed a chance to be contacted with low-temperature gas incurs damage from melting. Further, in the case of any of premixed combustion type engines, since more exhaust gas bearing a higher temperature remains inside the cylinders immediately after terminating an exhaust stroke, abnormal fuel combustion occurs, and further, since exhaust gas bearing a high degree of temperature directly comes into contact with the air-fuel mixture when the suction valve is opened, therefore resulting in the occurrence of back-fire phenomenon.

In any of the four-stroke engines, in order to raise the compression ratio while suppressing occurrence of abnormal fuel combustion, it has been indispensably necessary to cool off the peripheral portions of the fuel combustion chamber, causing much of combusted energy to be discarded into cooling water as the cooling loss. The term "abnormal fuel combustion" herein means a phenomenon called "knocking". Concretely, even when air-fuel mixture inside the combustion chamber has been heated up to a high degree locally, prior to propagation of fire from an ignition plug, the fuel-mixed vapor generates self-ignition simultaneously with the rise of inner temperature thereof as caused by increased pressure. Once the abnormal fuel combustion has occurred, the fuel-mixed vapor burns itself all at once at a timing much earlier than the originally intended timing, and thus, pressure inside the combustion chamber near the upper dead center abnormally increases, thus not only causing generation of unwanted knocking noise, but it also causes the component parts such as the piston and the piston head to incur unwanted damage, leading to significant decrease in durability of the entire engine components. On the other hand, when regenerating energy of exhaust gas, there is a problem of reducing reproducible energy by such an extent corresponding to the one discarded into the cooling water.

Hence, any of those skilled in the art often tries a heat insulating method that replaces metallic wall surface of the combustion chamber surrounded by the cylinder head and the piston head with ceramics that has extremely high thermal insulating characteristics as being introduced to some kinds of diesel engines. Nevertheless, the air-fuel mixture entered into peripheral portion of the exhaust valve is further mixed with highly-heated combusted gas that remained in the combustion chamber. Further, after being exposed to highly heated surface of the combustion chamber, temperature of the air-fuel mixture further rises, causing abnormal combustion to be generated very easily. Hence, the above-referred heat insulating means may cause temperature of the air-fuel mixture within the combustion chamber to rise furthermore, leading to abnormal combustion and melting of the exhaust valve to be occurred more easily. In any of conventional four-stroke engines, such heat insulating method obliges the compression ratio to be lowered in order to prevent the abnormal combustion and the melting of the exhaust valve from occurrence, otherwise it will result in the decreased efficiency of the system itself.

Although any of the gas turbine engines is advantageously compact in the configuration in contrast with the output capacity. Conversely, the gas turbine engine has a disadvantage due to poor specific fuel consumption under partial load conditions and also due to much time spent from engine starting up to fully open operating condition. As a practical means for improving the disadvantage thereof, "free piston type gas turbine" is known. Nevertheless, since the fuel combustion chamber of the displacement type engine conforms to the configuration of a two-cycle engine, regenerating pressure is substantially equal to the scavenging pressure. Hence, when the exhaust valve opens, exhaust gas freely expands up to the scavenging pressure to cause a portion of pressurized energy to be released. Further, since it is required to feed super-charging air for the fuel combustion inside the combustion chamber by a volume more than being required, it was imperative that a premixed combustion type engine could not be introduced, but available engine had thus far solely been restricted to a direct injection engine. The above cited free piston type gas turbine engine does not have a crank shaft, therefore leading to such disadvantages as poor controllability on the cyclic number per hour corresponding to the number of the rotation of the engine and also poor response to load change.

Some kinds of exhaust catalyst may cause poor reduction of nitrogen oxides if the oxygen density were too high. To cope with this problem, it is conventionally practiced to positively feed circulative exhaust gas to the suction port of an engine by applying the Exhaust Gas Recirculation (EGR) system. For a six-cycle engine, however, if the suction air and the scavenging air were evenly mixed with circulative gas, it will cause the oxygen density present in the suction air to be lowered resulting in decreasing volume of fuel to be combusted, leading to decreased output power. On the other hand, fresh air intermingles with the scavenging air, and thus, exhaust gas passing through the catalyst still contains excessive oxygen as another problem to solve.

Generally, the arrangement of cylinders for a multi-cylinder six-cycle engine may be implemented based on an identical method for arranging cylinders adopted by any of conventional two-cycle engines. However, in the case of a six-cycle engine having a certain number of those cylinders corresponding to multiples of three, if they were arranged according to the two-cycle cylinder arrangement, it will fail to form such an engine capable of generating explosions in equal intervals, and thus, this engine can hardly be used for an automobile. In many cases, provision of six cylinders is preferable for a six-cycle engine due to a less number of explosions per rotation. Nevertheless, in the case of a V-type engine that are customarily applied to automobiles, if explosions were generated at equal intervals, another problem will be posed because there is only such an arrangement that causes the primary vibrations to be generated.

At present, so-called FF vehicles including such an automobile equipped with an engine being disposed at the front part and driven with the front wheels are mainly prevailing in the market. When mounting a hybrid system driving unit on an FF vehicle prevailing in recent years, width of the driving unit such as the engine and the motor becomes a problem. When taking efficiency of the power transmission system into account, it is desired that the motor and the revolving shaft of the engine be mounted in the lateral direction against the chassis. On the other hand, it is required to expand the width of the chassis by such an extent corresponding to the width of the motor. This arrangement makes the configuration of the vehicle body to be different from the original design. Even though being intended to configure a new chassis, further expansion of the chassis width by 100 mm will fatally affect the marketability for a compact vehicle. Due to this problem, development of the hybrid vehicles has been limited to a few kinds thereof up to the present.

In terms of the fuel cost, provision of such a vehicle comprising a combination of a diesel engine with a hybrid system is ideal. Nevertheless, aside from the above-referred problems, due to a variety of technical problems with regard to available space including auxiliary systems of diesel engines attached with superchargers and another problem related to torque characteristics, the above combination system has not been established for conventional automobiles to date.

Definition of Technical Terms

In the present invention and explanations thereof, the above referred direct-injection engine specifically includes a compressive ignition engine and an electric spark ignition engine that is provided with fuel injection valves inside cylinders. Henceforth, such a regenerative pressure that produces a maximized theoretical efficiency of the entire unit of the displacement type engine equipped with a regenerator is referred to as the ideal regenerative pressure. It is interpreted that the hybrid vehicles conceptually include the electrical unit type and the oil hydraulic unit type. In this case, it is meant that, when being referred to as a generator, an oil hydraulic pump is used. When being referred to as a battery, it means that an accumulator is used. When being referred to as a power line, it means that a highly pressurized oil passage is used. When being referred to as "power is converted into electric power", it means that fluid is provided with high pressure before being transferred. The same rule applies to the Claims in this specification.

Means for Solving Problems and Practical Effect

The first means for solving the problem according to the invention is an internal combustion engine being configured as a six-cycle engine equipped with a regenerator, said engine comprising a displacement type engine and another engine that extracts an output power from exhaust gas emitted from the displacement type engine via said regenerator.

As a practical effect of the first means for solving problems, a displacement type engine is provided as a six-cycle engine. The presence of the strokes of (5) introduction of scavenging air and (6) exhausting the scavenging air enables the fuel combustion chamber and the exhaust valve to be cooled off with scavenging air. Even after raising the regenerating pressure, the exhaust valve therefore remains being free from incurring melted loss. The above treatment also enables the regenerator to be thermally stable advantageously. When the suction valve opens simultaneously with the start of the suction stroke, gas inside the fuel combustion chamber potentially generating reverse current should be the scavenging air. Even when the regenerating pressure has been raised, and yet, even when the internal gas comes into contact with the suction air, because the internal gas bears a low temperature, the invented six-cycle engine is free from incurring back-fire phenomenon.

Further, since the six-cycle engine internally cools off the combustion chamber, even when the heat insulation is implemented, abnormal fuel combustion can hardly occur. Due to this reason, unlike the conventional practice that discards the combusted energy into cooling water, it is possible to convert the combusted energy into driving power via the regenerator, thereby advantageously improving the regenerating efficiency.

The second means for solving problems according to the invention is the internal combustion engine based on the first means, further comprising a scavenging port being independent of an suction port and a system that forces a large portion of the exhaust gas emitted from the regenerator to be circulated to a scavenging port.

The second means for solving problems makes oxygen density of exhaust gas passing through catalyst to be lowered without lowering oxygen density of the suction air, thereby promoting the reductive action of catalyst. In the direct-injection six-cycle engine, there is a method of feeding fresh air via the scavenging port and the suction port in common with each other. In this case, it is required to provide a stationary exhaust-gas purifying system such as a water-washing unit for eliminating nitrogen oxide or the like from exhaust air. Unlike this system, the second means enables to introduce a catalyst-applied compactly configured exhaust-air purifying system advantageously.

The third means for solving problems according to the invention is the internal combustion engine based on the first means, further comprising an exhaust manifold disposed between the six-cycle engine and the regenerator, said exhaust manifold being covered with a heat insulating material, thereby thermally insulating the exhaust manifold.

The third means for solving problems advantageously increases the regenerative output without vainly wasting energy of exhaust air fed to the regenerator in peripheral portions. In the case of any conventional four-cycle engine provided with a turbocharger, in order to prevent journal of the exhaust gas turbine from incurring thermal damage, the exhaust gas turbine has positively been cooled off by making the exhaust-gas manifold be exposed to external atmosphere directly for the cooling. On the other hand, in the case of the six-cycle engine, since temperature borne by exhaust air remains low due to presence of scavenging air, the temperature of the exhaust manifold is positively preserved so as to feed more amount of exhaust-air energy to the regenerator, thereby enhancing overall efficiency of the engine. Although the six-cycle engine provided with a regenerator is apt to consume a longer time for raising temperature of catalyst than the time required for the four-cycle engine, the third means enables to contracts the required time. There is a further means for raising temperature of the exhaust-air catalyst by circulating EGR gas around the catalyst. In order to improve efficiency, the exhaust port up to the regenerator should be further insulated.

The fourth means for solving problems according to the invention is the internal combustion engine based on the first means, wherein said regenerator is provided with such a mechanism that varies the volume of passing exhaust gas, said mechanism being used for varying the regenerative pressure, thereby being capable of controlling proportion between the power output from the six-cycle engine and the power output from the regenerator.

As a substantial effect of the fourth means for solving problems, the present invention provides an internal combustion engine suitable for such a case of feeding driving power by varying the distributive ratio thereof for two kinds of loads. The engine based on the fourth means is suitable for being used as a mover for a movable object such as an agricultural machine that requires the driving power of mechanical components for reaping and threshing farm products irrespective of the running speed of the agricultural machine and a pleasure boat that requires the driving power for driving a relatively large generator independently of the propelling force.

The above principle is described below. When regenerative pressure has been raised so as to enable the regenerator to extract as much output as possible, while the exhaust stroke (4) and the exhaust of scavenging air stroke (6) are underway, in order to discharge gas from cylinders, the six-cycle engine consumes its own moving energy. Further, whenever the regenerative pressure has been raised, gas volume remained in the fuel combustion chamber during the exhaust of scavenging air stroke (6) increases. In the following suction stroke (1), therefore, volume of intake gas decreases, resulting in decreasing the output torque of the six-cycle engine. Due to the above cited double effects, the power output from a six-cycle engine lowers relatively to the increased regenerative pressure. On the other hand, the power output from the regenerator simply becomes higher relatively to the higher regenerative pressure. The means for solving problems according to the present invention properly controls the proportion of the output from the six-cycle engine and the regenerator by properly controlling the regenerative pressure based on the above principle.

In order to vary the regenerative pressure when using a displacement type expander as a regenerator, the number of the rotation of the expander is varied. When a gas turbine is used to function as a regenerator, the regenerative pressure can be varied by way of varying total area of nozzles that inject gas against turbines. In particular, when a gas turbine with variable number of nozzles is used, it is advantageously possible to constantly maintain a high efficiency of such an internal combustion engine of which exhaust gas volume varies due to variable load while operating a compactly built gas turbine as a regenerator.

The means for solving problems enables the control of the regenerative pressure to be constant independently of the load applied to the six-cycle engine, thereby producing such a practical effect that prevents the power output from the regenerator from growing too much. When the six-cycle engine provided with a regenerator incurs substantial load, the engine draws greater volume of air into cylinders and consumes more fuel resulting in maximum pressure increase. When this aspect is present, an ideal regenerative pressure also rises. To cope with this effect, expansion ratio inside the regenerator also rises. In consequence, power output from the regenerator increases beyond the increased rate of power output from the entire engine unit. In contrast with this, stabilizing the regenerative pressure to be constant substantially makes the expansion ratio in the regenerator remain invariable and the power output from the regenerator be merely proportional to the gas volume exhausted from the whole engine, thereby enabling to suppress the output from the regenerator. Due to this effect, it is possible to contract the dimensions of a generator that absorbs power output from the regenerator, thereby also making it possible to contract the loading capacity of a generator controller, capacitors that store electric power therein, and motors respectively using generated power, thus advantageously enabling to contract overall dimensions of the system.

In a naturally-aspirated six-cycle engine, the ideal regenerative pressure grows approximately to four barometric pressure, leading to an ideal regenerative pressure of a six-cycle engine with a supercharger becoming higher. The regenerator dealing with such a high pressure, irrespective of being a displacement type expander or a gas turbine, will be the one with multiple stages resulting in the complex system. Hence, a steady control of the regenerative pressure to be at below approximately four barometric pressure makes it possible to configure the regenerator with single stage, thus simplifying the regenerator system advantageously. Although the overall efficiency of the engine including the fully-loaded regenerator slightly lowers, the power output from the six-cycle engine itself in the fully loaded condition can become higher than the case of using the ideal regenerative pressure advantageously. This in turn promotes the gas exchange efficiency between the scavenging air and the suction air resulting in the enhanced maximum power output from the whole of the engine, thus providing a further advantage in terms of thermal load.

The fifth means for solving problems according to the invention is the internal combustion engine based on the first means further comprising a supercharger being disposed at suction port and a gas turbine being used as regenerator and disposed at exhaust port, said gas turbine extracting a majority of output power from the six-cycle engine.

Based on a consideration that there is a critical limit in the maximum pressure in the fuel combustion chamber of the six-cycle engine, it is apparent that, when supercharging pressure rises, output of the six-cycle engine decreases and contrary to this, the output of the regenerator increases. When the supercharging pressure is raised to approximately four barometric pressure or a higher degree, an internal combustion engine will be the one which produces almost all power output from the gas turbine functioning as a regenerator. In other words, it should be referred to as a six-cycle gas turbine that uses a six-cycle internal combustion engine functioning as a fuel combustion chamber. Henceforth, the internal combustion engine defined by this means for solving problems according to the present invention will be referred to as the six-cycle gas turbine.

The six-cycle gas turbine becomes a driving motor that is compactly configured and easily controllable in the utilities each having a high rotational number of the driving shaft. When the six-cycle gas turbine is applied to the power generation, owing to a high rotational number of the output shaft and thus a fast speed to cut the magnetic flux of a power generator, it is possible to secure a higher voltage of the power generator. As a result, it is possible to configure the power generator compactly. And the six-cycle gas turbine is configured with a specific regenerative pressure that is higher than the supercharging pressure, there is no need to limitlessly increase the volume of scavenging air in contrast with a free-piston type gas turbine. Further, the exhaust air does not freely expand during thermal cycles. The six-cycle gas turbine therefore produces a high thermal efficiency. Further, since the six-cycle gas turbine can separate gas by individual ports such that fuel-air mixture is routed to the suction port, whereas fresh air and inter-circulating gas is routed to the scavenging port, not only for diesel engines, but the six-cycle gas turbine is also applicable to premixed combustion type engines as another advantageous feature. Since a six-cycle engine with a crank shaft is used for a displacement-type engine, it is also possible for the six-cycle gas turbine to introduce a controlling system that conforms to an internal combustion engine using a crank shaft. The six-cycle gas turbine therefore has an advantageous feature that enables the controller to easily control the rotational number and varied load.

Due to reciprocating movement of pistons, the displacement-type engine generates inertial vibrations, and thus, when a displacement-type engine directly transmits the output power to a driving shaft of a mobile object such as a ship which is connected to a screw propeller for example, since the output shaft is secured to the hull, vibrations generated by the driving shaft transmits to the hull, causing passengers to feel discomfort. On the other hand, in the case of the six-cycle gas turbine, since the power output from the displacement type six-cycle engine is used for driving auxiliary units such as a supercharger or a power generator, it is possible to install the six-cycle engine on a ship via a soft mount, and thus, vibration does not transmit to the hull. Further, owing to the presence of the regenerator, sound of exhaust air remains quiet, and yet, fuel cost can be saved as another advantage. Further, the driving shaft such as a screw propeller can be rotated directly via a turbine that only generates negligible vibration. Alternatively, the driving shaft can be rotated with a motor using electric power after converting the driving power into electricity via a generator. Hence, the six-cycle gas turbine promotes both the fuel-cost economy and marketability merchandisable possibility as the driving source for liners and hybrid cars.

Further, compared to any of conventional generators based on conventional displacement-type engines, the six-cycle gas turbine generates quiet exhaust sound and saves fuel cost, and further, due to internal cooling effect, any cooling system can be made simple. Hence, it is possible to constitute a power supply source of a trailer house or a cottage as a power-generating motor that can easily be actuated and controllable and also available as a portable generator with satisfactory fuel cost economy. Further, the six-cycle gas turbine is also excellent as a power source of an air compressor having approximately below IMPa of capacity when using a compactly configured turbine-type compressor.

Any of conventional internal combustion engines is replaceable with a six-cycle gas turbine specifically available for a power generator in a range from a small one with 30 KW of capacity up to the one having more than 10 MW of large capacity specifically available for a power station by way of installing a number of six-cycle engines that constitute a displacement type engine. In the case of a large-scale generator provided for a power station, it is possible to enhance the operating efficiency of a conventional gas turbine. In this case, it is possible to apply a combined cycle that rotates a steam turbine with residual thermal energy present in the exhaust gas. This method has been utilized due to a possibility to enhance overall efficiency. On the other hand, due to leakage of gas and loss in the thermal conduction, it is difficult to enhance operating efficiency of the gas turbine in the range of 100 KW capacity. Further, it is also difficult to use an combined cycle that uses exhaust heat due to its small size, and thus, such a compactly configured engine is inferior to the four-stroke diesel engine in the operating efficiency. The above-cited compactly configured gas turbine is therefore merely used for an emergency power generator availing of its own compactness. In contrast with this, the six-cycle gas turbine has compactly configured with such a combined cycle that is capable of converting pressure energy remaining in exhaust gas present in a displacement-type engine into driving power via a regenerator, and yet, the operating efficiency is superior to the four-stroke diesel engine. Due to this reason, a small-scale six-cycle gas turbine has a merit in practical use. Further, it is also possible for a large-scale six-cycle gas turbine to add an exhaust heat regeneration system to rotate a steam turbine with thermal energy remaining in the exhaust gas, thereby promoting fuel cost economy for conventional gas turbines available for the thermal power generation.

The sixth means for solving problems according to the invention is the internal combustion engine based on the first means, further comprising: a displacement type compressor that functions as a supercharger; a motor-generator that is capable of re-starting the six-cycle engine, said compressor and motor-regenerator being disposed in the output shaft of the six-cycle engine; an exhaust gas turbine that functions as a regenerator; and a mechanism being used for varying the overall area of the nozzle of said exhaust turbine.

The internal combustion engine based on the sixth means for solving problems is provided with a displacement-type compressor that functions as a supercharger by rotating itself in proportion to the number of the rotation of the six-cycle engine, and thus, suction-air volume is proportional to the number of the rotation of the six-cycle engine thereby stabilizing the supercharged pressure to be constant before feeding exhaust gas to the regenerator, where the volume of exhaust gas is substantially proportional to the number of the rotation of the six-cycle engine. In the case of the turbine-type compressor, pneumatic pressure proportional to the square of the rotational number is generated. In order to generate supercharged pressure stable to variation of the number of the rotation of the engine, it is necessary to selectively and properly use an operating turbine by combining a plurality of superchargers with each other. On the other hand, in the case of the displacement-type compressor, it is possible to maintain the supercharged pressure to be constant substantially by merely arranging the rotational number proportional to the engine, thereby advantageously decreasing the number of element of the system.

The power output from the six-cycle engine is used for driving the supercharger and feeding highly pressurized exhaust gas to the regenerator. In this case, it is possible to consider that the six-cycle engine functions as a high-pressure gas generator. Hence, it is possible to properly control all the power output from the six-cycle engine by controlling the rotational number thereof. In order to properly control the rotational number of the six-cycle engine, a controlling computer is operated to mainly vary overall area of nozzles of the exhaust turbine so as to vary the regenerative pressure. The rotational number of the six-cycle engine can be controlled more precisely by varying load via a process for controlling absorptive torque of the motor generator secured to the output shaft of the engine.

As described above, except for such a case requiring a subtle control over suction air during idling rotation, basically, the internal combustion engine based on the above-referred means for solving problems can properly control the power output from the six-cycle engine without an exclusive means for controlling output power such as a throttle valve, and thus, the above engine is structurally simple, and yet, provides satisfactory operating efficiency without incurring pumping loss otherwise caused by the throttle valve as an advantageous feature. When the above internal combustion engine is operated as a six-cycle gas turbine that extracts the majority of output power via the regenerator or in the case of using output power from the gas turbine plus output power from six-cycle engine for power generation, the invented internal combustion engine enables compact configuration and easy external control over the output power with high efficiency. Due to the presence of the regenerator, the engine produces quiet exhaust noise, and thus, the six-cycle gas turbine is particularly advantageous as a generator to be mounted on a hybrid vehicle.

The seventh means for solving problems according to the invention corresponds is the internal combustion engine based on the first means through the sixth means, further comprising a combustion chamber disposed inside an exhaust port between the six-cycle engine and the regenerator.

As one of practical effects produced by the seventh means for solving problems, it is possible to eliminate unburned elements left in the exhaust gas and properly control the actual condition of oxygen density and temperature. In the six-cycle engine, due to presence of the scavenging stroke, exhaust gas is apt to contain excessive oxygen. Since the fuel combustion process is executed in the condition of a fuel rich, unburned gas ingredients still remains in the exhaust gas during the exhaust stroke (4). However, since the exhaust gas generated via the exhaust stroke (4) and the exhaust gas generated via the scavenging stroke (6) are alternately discharged, and thus, it is quite difficult to securely mix such exhaust gases via the exhaust port. In this case, residual gas ingredients are burnt by catalyst after passing through the regenerator. This in turn not only causes catalyst to bear an increased load, but it also causes abnormal rise of temperature borne by catalyst, and yet, it also causes the fuel cost to be increased. However, the seventh means for solving problems makes it possible to combust the unburned securely before the regenerator, i.e., inside the combustion chamber communicated with the exhaust port. In order to promote this effect, it is also effective to constitute the combustion chamber with catalytic material. In the case in which exhaust gas contains excessive oxygen, by means of securing a fuel supply device in linkage with the combustion chamber, it is possible to lower the oxygen density contained in the exhaust gas. The seventh means provides such an advantage in being capable of more precisely controlling actual condition of the catalyst by way of temporary reduction of the exhaust gas without varying the operating condition of the six-cycle engine. Further, it is also possible to apply the seventh means in order to contract the time spent for raising temperature of the catalytic material in the warm-up time.

As the second effect of the seventh means for solving problems, it is possible to strengthen the power output from the regenerator. Combusting unburned gas securely also enables the power output from the regenerator to be increased. Further, injecting fuel into the combustion chamber by using an fuel injecting device makes it possible to raise temperature of exhaust gas up to the critical temperature allowed for the gas turbine so as to increase the output power from the regenerator. Since the regenerative pressure remains high in the six-cycle engine provided with a regenerator and a supercharger, the regenerator can efficiently convert energy on combustion in the combustion chamber into the driving power, thus combustion efficiency rarely lowers. As a typical example of the publicly known art similar to the present invention, there is an afterburner secured to a jet engine mounted on a fighter aircraft for example. Since oxygen density remaining in the exhaust fume emitted from the above six-cycle engine provided with a regenerator is not as dense as that is contained in the exhaust fume emitted from a jet engine, the above six-cycle engine does not generate such a practical effect that remarkably enhances the output power. However, by replacing the scavenging air with fresh air to full extent, it is possible to maximize the fuel combusting effect for the six-cycle engine according to the present invention.

The eighth means for solving problems according to the invention corresponds to a movable body that is equipped with an internal combustion engine based on the first means, comprising a drive power transmitting mechanism that transmits power output from a six-cycle engine to a drive wheel, a motor that drives wheels of the movable body, a drive power transmission mechanism that transmits the driving power of said motor to the drive wheel, and an electric generator that is secured to an output shaft of the regenerator.

The movable body conforming to the eighth means for solving problems provides such an advantage that enables the power output from the above regenerator to be converted into the driving energy efficiently. Since the demand for hybrid vehicles tends to increase recently, there is such an advantage requiring a less number of additional parts by feeding power to the driving motor originally provided for the hybrid vehicle. In this case, it is also possible to provisionally store the generated power in a battery. Hence, it is possible to introduce a system of a hybrid vehicle featuring satisfactory fuel cost economy into a movable body only by means of such a battery and some of parts having larger dimensions. In a converse sense, by applying the eighth means for solving problems to conventional hybrid vehicles, it is possible to obtain such a motor that is mountable on a hybrid vehicle featuring satisfactory fuel consumption efficiency.

The ninth means for solving problems according to the invention corresponds to a series type hybrid movable body that is equipped with an internal combustion engine set forth in Claim 6.

The engine mounted on a movable body based on the ninth means for solving problems is simply configured and quickly actuated. Even when varying the rotational number, due to satisfactory operating efficiency, the built-in battery may be of a small capacity, and thus, it is advantageously possible to configure an overall hybrid system with a light weight. Hence, by applying to urban buses, trucks with a compact loading capacity, and taxis, respectively being operated at a relatively slow speed in average by accelerating and decelerating the traveling speed for many times during on-road services, from the viewpoint of characteristics particular to the series type hybrid system, practical effect is particularly noticeable from the fuel cost economy.

The tenth means for solving problems according to the invention corresponds to the internal combustion engine defined in Claim 1, wherein said six-cycle engine is configured with W-shaped six cylinders having both sides being tilted by 60 degrees.

The above-referred six-cycle engine provided with a regenerator based on the tenth means for solving problems is an engine with six cylinders and capable of generating serial explosions at 180° of intervals without causing inertial primary vibrations to be generated. This six-cycle engine is advantageously compact in the axial direction of the crank. This six-cycle engine can easily be mounted on a vehicle even when being mounted on the chassis in a lateral direction or a longitudinal direction to the chassis. In particular, the above six-cycle engine is quite useful for mobile bodies having more than 2000 cc of displacement such as passenger cars, compact and medium size trucks for example.

The eleventh means for solving problems according to the invention corresponds to a front-wheel driven vehicle comprising an internal combustion engine according to Claim 1 further being configured as V-shaped four cylinder six-cycle engine being tilted by 90 degrees, or an internal combustion engine according to Claim 10, the rotating shaft of said internal combustion engine being disposed laterally against the moving direction of the vehicle.

The vehicle corresponding to the eleventh means for solving problems provides such an advantage that is capable of presenting a hybrid vehicle compatible with a front-wheel-drive vehicle equipped with a conventional premixed combustion type four-stroke engine. Although it was impracticable to mount on a hybrid engine in combination with a diesel engine, both can be combined with each other by compactly forming a six-cycle engine by strengthening supercharging pressure. Since the 90° V-shaped six-stroke four-cylinder engine capable of generating explosions at 270° of equal intervals and the internal combustion engine set forth in Claim 10 capable of generating explosions at 180° of equal intervals are respectively capable of generating explosions at equal intervals suitable for automobiles, and yet, availing of negligible vibration and relatively short width of the above engines, the means has solved the above problem. Configuration of the six-cycle engine with the V or W shape causes the longitudinal length of the six-cycle engine to extend to some extent. However, since it is possible to extend the front portion of the vehicle chassis, the six-cycle engine is compatible with conventional front-wheel drive vehicles. Extension of the front portion is instrumental to secure proper space for mounting parts for hybrid vehicles as a result of the expansion of the engine chamber, and thus, the extended front portion does not become a fatal defect.

As described above, the means for solving problems according to the present invention is capable of converting the FF (front-engine front-drive) vehicle equipped with a laterally disposed engine having more than 2000 cc of displacement sharing the main stream in a wide variety of compact cars dominantly prevailing in the world market into the hybrid configuration. Further, it is also possible to convert the internal combustion engine into the diesel engine, and thus, this will certainly provide a substantial effect for decreasing oil consumption worldwide.

BRIEF DESCRIPTION OF THE DRAWINGS

FIG. 6 is a simplified schematic PV diagram of the whole of the six-cycle engine according to the fifth embodiment of the present invention, wherein FIG. 6A illustrates the whole view and FIG. 6B illustrates an enlarged view in the periphery of the origin;

EXPLANATION OF THE REFERENCE NUMERALS

Figure 1:
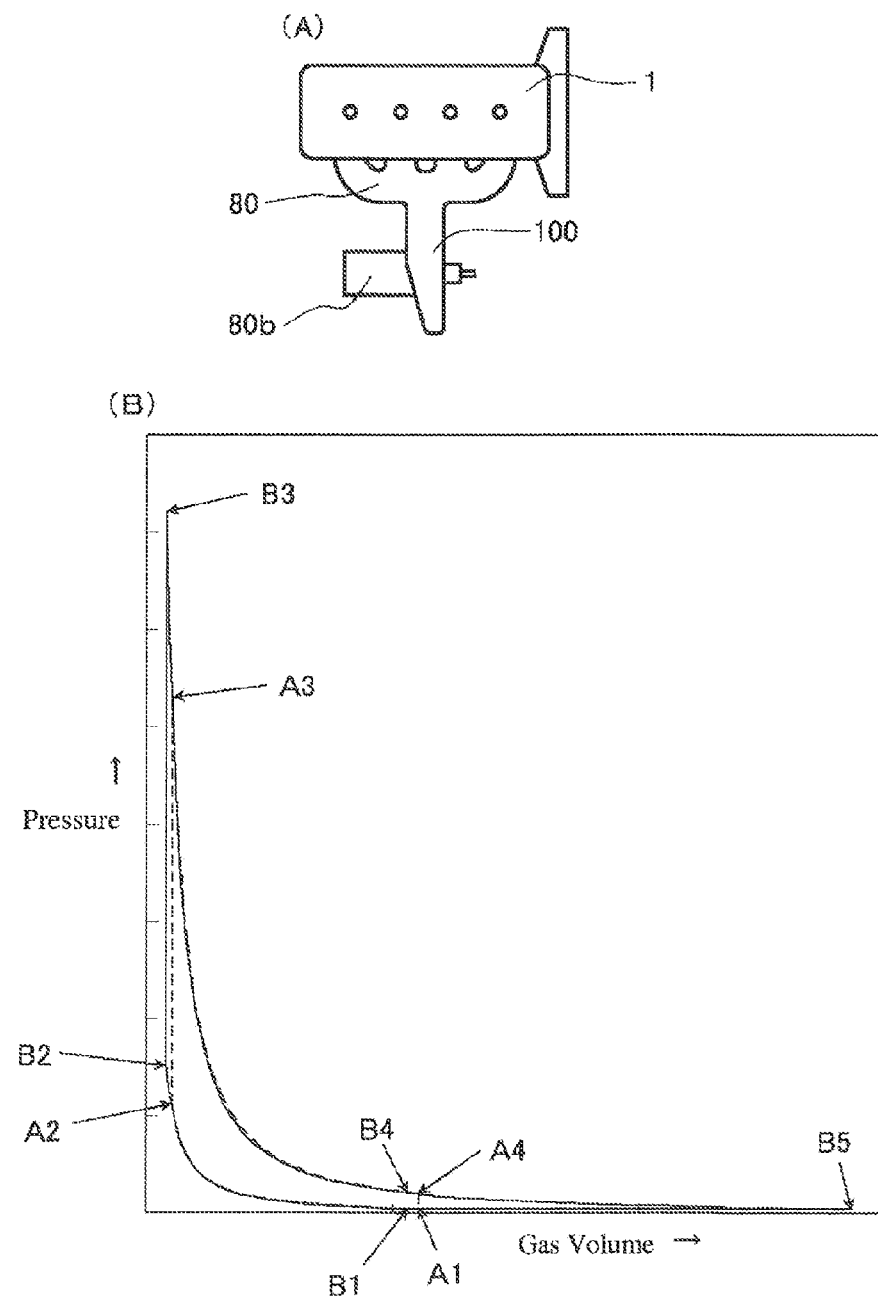
FIG. 1A is a simplified schematic block diagram of a six-cycle engine provided with a regenerator according to the first embodiment of the present invention.
FIG. 1B is a conceptual graphic chart, in which the PV line of a four-cycle gasoline engine and a six-cycle engine provided with a regenerator is drawn.

1: A six-cycle engine
18: A direct-injection type injector
20: A cylinder head
21: An suction port
22: An suction valve
23: A throttle valve
24: An accelerator sensor
31: An exhaust port
32: An exhaust valve
35: A waste gate valve
41: A scavenging port
42: A scavenging valve
43: The second valve
43B: A scavenging port valve
50$a$1-50$c$2: Crank pin
51$a$1-51$c$2: Piston
52: A rotational number sensor
68: An exhaust sensor
70: A combustion chamber
71: Insulating material
72: Inner wall of the combustion chamber
73: Gas emitting hole
75: A fuel feeder
80, 80$b$: Exhaust manifold
91: An actuator
94: A scavenging port valve actuator
100: A regenerator (or an exhaust turbine)
111: A circulating port
112: A cooling unit
150: An auxiliary unit
151: An electric generator
152: A reduction gear for an auxiliary engine
153: A clutch for an auxiliary engine
154: A belt for driving an auxiliary engine
155: A motor that also serves as a generator
180: A transmission
181: A power transmitting belt
200: A supercharger
200$b$: A gas admission port for a supercharger
210: A displacement type compressor acting as a supercharger
280: An overdrive unit
360: A rotational actuator
520: A speed change gear (a transmission)
522, 522$b$: A drive shaft
525, 525$b$: A drive wheel
550: A vehicle driving motor
560: A motor controller

561: A power circuit
580: A battery
610: A controlling computer

THE BEST FORM FOR IMPLEMENTING THE PRESENT INVENTION

The "Atkinson's cycle" has not been in practical use. But as a result of an overall study on a six-cycle engine that had never been utilized on the industrial basis, by combining the six-cycle engine with a rotational regenerator, the inventor has successfully realized the "Atkinson's cycle" as a combined-cycle engine that can be configured compactly and efficiently implemented. Hence, the inventor has successfully improved the thermal cycle efficiency of internal combustion engines.
The First Embodiment FIG. 1A is a plan view of a schematic block diagram of a four-cylinder six-cycle engine provided with a regenerator based on the first means for solving problems. An exhaust turbine 100 constituting a regenerator is secured to an exhaust manifold 80 of a non-supercharged six-cycle engine 1. The exhaust turbine 100 converts pressure remaining in exhaust fume into rotating energy, and then discharges gas containing lowered pressure to the atmosphere via an exhaust manifold 80b disposed on the downstream side of the regenerator.

FIG. 1B is a graphic chart (this will be referred to as a PV line chart hereinafter) that illustrates variation of the volume and the pressure inside a fuel combustion chamber during a compression stroke and an explosion/expansion stroke of a non-supercharged four-cycle engine and the engine based on the first means for solving problems. The dotted line corresponds to a PV line when a compressive ratio is 9.5 with a premixed combustion type four-cycle engine. The height at a point A1 designates suction pressure that is equal to atmospheric pressure, and the position of the lateral axis designates the inner volume of a cylinder when a piston is positioned at a lower dead center. Variation of the volume and the pressure during an adiabatic compression process in the course of the rise of the piston is shown by a curved line that rises to the left in a range from point A1 up to point A2. When the piston has reached upper dead center A2, an ignition takes place, and then, pressure inside the cylinder is raised up to point A3 due to the rise of temperature therein. Then, as a result of the descending movement of the piston, combusted fuel gas expands in an adiabatic condition. When the piston has reached lower dead center, the internal pressure reaches point A4. When the exhaust valve opens, combusted gas remaining in the fuel combustion chamber freely expands down to point A1 corresponding to the atmospheric pressure. Differential pressure between the points A4 and A1 indicates the presence of pressure energy that is released without being collected via free expansion that occurs when the exhaust valve is open. Thenceforth, after completing an exhaust stroke and a suction stroke, the process returns to the point at A1 to terminate one cycle operation.

Figure 2:
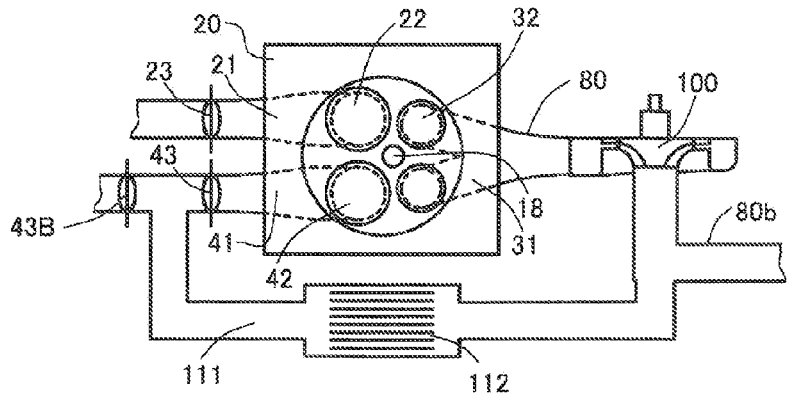
FIG. 2 is a simplified schematic block diagram of the EGR (Exhaust Gas Recirculation) system provided for the six-cycle engine according to the second embodiment of the present invention.
Figure 3:
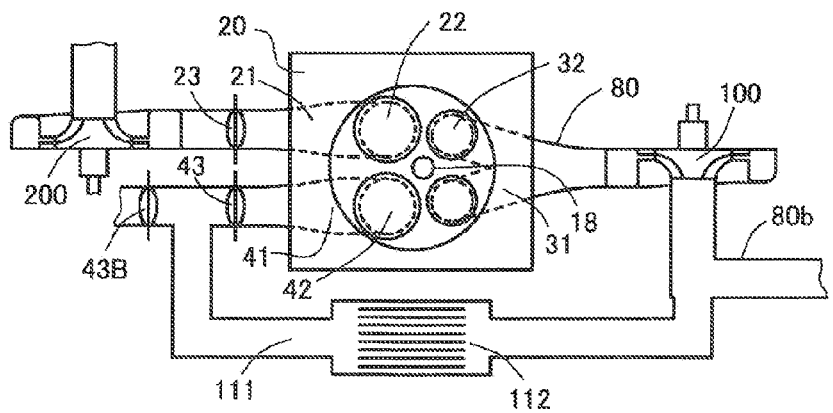
FIG. 3 is a simplified schematic block diagram of the EGR system provided for the six-cycle engine that is provided with a supercharger according to the third embodiment of the present invention.
Figure 5:
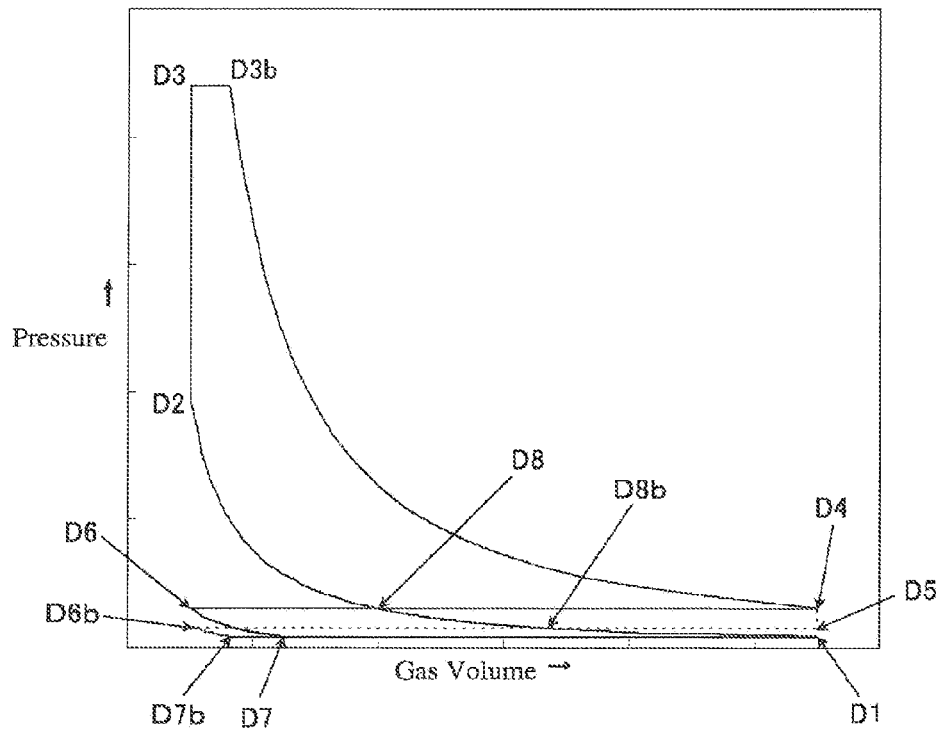
FIG. 5 is a graphic chart, in which the PV line of the six-cycle engine portion of the six-cycle engine equipped with a regenerator based on the fourth means for solving problems according to the fifth embodiment of the present invention is drawn.

The solid line indicates a PV line of a six-cycle engine provided with a regenerator that has an identical displacement with 12.2 of the compressive ratio. The PV line shown in the chart includes a compression stroke, an explosion/expansion stroke and another expansion stroke executed inside the regenerator. The difference in the compression ratio of the six-cycle engine from that of a four-cycle engine is caused by a fact that gas temperature at the end of an suction stroke of the six-cycle engine is lower than that of the four-cycle engine because the six-cycle engine is subject to an internal cooling process with scavenging air. A gas compression stroke begins at point B1. When piston is at top dead center, displacement of six-cycle engine is less than that of four-cycle engine, thus the displacement at the time of initiating the compression is also less because six-cycle engine has a higher compression ratio. The point B2 is reached when the piston reaches upper dead center after being compressed under an adiabatic condition during the compression stroke. Simultaneously, an ignition and combustion of fuel take place, making the inner pressure rise up to point B3. Combusted gas expands under an adiabatic condition during expansion stroke, and then, when the piston reaches at the lower dead center, the exhaust valve opens itself at point B4, and then, exhaust gas is transferred from the six-cycle engine to the regenerator while maintaining the pressure at point B4. The actual pressure present at point B4 is referred to as the regenerative pressure. When PV line appears as the solid line shown in FIG. 1, an ideal "Atkinson's cycle" is realized, thereby enabling theoretical efficiency of the present six-cycle engine to be maximized. Hence, the regenerative pressure is referred to as the "ideal regenerative pressure". Thenceforth, exhaust gas further expands adiabatically in the regenerator up to the pressure shown at point B5, and finally, the exhaust gas is released to the atmosphere. After passing through the point B4, the six-cycle engine goes through an exhaust stroke, a scavenging air introducing stroke, an exhaust of scavenging air stroke, and an suction stroke before completing one cycle. Besides exhaust gas that is discharged via an exhaust stroke, exhaust gas discharged via the scavenging air exhausting stroke is also led into the regenerator. However, when discussing about cycle efficiency, assuming that the above-referred exhaust gas turbine 100 fully collects energy for compressing and discharging scavenging air for the six-cycle engine, then, the exhaust gas discharged via the exhaust of scavenging air stroke has no influence thereon, and thus, the graphic chart shown in FIG. 1B deletes any consideration concerning this effect.
The Second Embodiment FIG. 2 is a schematic block diagram of an exhaust gas recirculation (EGR) system provided for the six-cycle engine, which corresponds to the second means for solving problems, in which a fuel combustion chamber in a cylinder head 20 built in this multiple cylinder engine according to this embodiment is viewed from the cylinder side. FIG. 2 shows a poppet type suction valve 22, a scavenging valve 42, an exhaust valve 32, and a nozzle portion of a direct-injection injector 18, which are collectively disposed in the fuel combustion chamber. The above fuel combustion chamber has a plurality of small-size exhaust valves 32. This is because, as described on FIG. 5 later on, the timing for opening the exhaust valves during the exhaust of scavenging air stroke is short (between point D8 and point D6 as shown in FIG. 5), and thus, it is necessary to open and close all the exhaust valves as fast as possible. There is a gas passage 111 that enables exhaust gas to be circulated to the scavenging port provided or the six-cycle engine. A cooling unit 112 is disposed inside the gas passage 111. The second valve 43 regulates the volume of scavenging air, whereas a scavenging valve regulates the volume of fresh air mixed into scavenging air. When supercharging the six-cycle engine, normally, it is necessary to discretely provide a supercharger for scavenging air and suction air.
The Third Embodiment FIG. 3 is a schematic block diagram of an exhaust gas recirculation (EGR) system built in the six-cycle engine provided with a supercharger, which corresponds to the second embodiment of the second means for solving problems according to the present invention. Only the suction port of the six-cycle engine is provided with a supercharger 200. As the difference from the second means, the EGR system equipped with the supercharger 200 deals with pressure that is higher than the exhaust gas pressure passing through the scavenging port. Due to lower pressure of scavenging air, the scavenging air is compressed during a exhaust of scavenging air stroke inside the six-cycle engine, and then expelled to the exhaust port. Weight of the scavenging air decreases compared to suction air to the extent that the pressure is low. When the scavenging air has been supercharged, due to adiabatic compression, the temperature rises. On the other hand, scavenging air cools off the interior of the fuel combustion chamber with a temperature lower than that of compressed air. And this provides an advantage of dispensing with a supercharger for scavenging air.

The Fourth Embodiment

Figure 4:
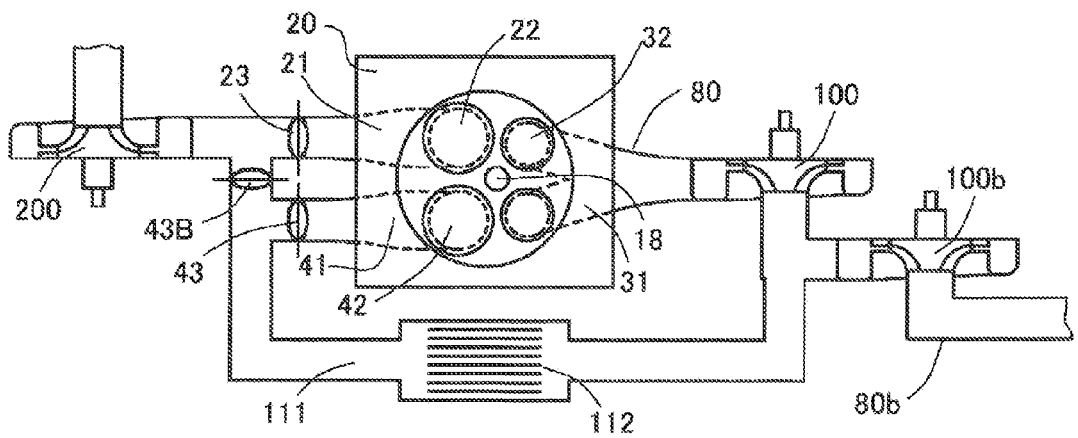
FIG. 4 is a simplified schematic block diagram of the EGR system provided for the six-cycle engine that is provided with a multiple-stage regenerator according to the fourth embodiment of the present invention.

FIG. 4 is a schematic block diagram of an EGR system provided for the six-cycle engine equipped with a supercharger according to the above third embodiment based on the second means for solving problems. A couple of regenerators 100 and 100B are disposed in series, and in addition, a gas passage 111 is formed for circulating exhaust gas between the regenerators 100 and 100B with a cooling unit 112 installed in the passage. In order to realize the best method for achieving good thermal cyclic efficiency, as in the embodiments shown in FIGS. 2 and 3, it is preferable that the cooling unit 112 cools off exhaust gas that has been expanded up to the atmospheric pressure, and then the cooled exhaust gas is again supercharged for use. However, in case where the scavenging air is supercharged, it is no need to use a supercharger that is solely used for scavenging air. Besides, because of high pressure of the circulating gas, it is possible to generate supercharging effect even when the cooling temperature remains high, making it possible to contract the size of the cooling unit advantageously. This is because, exhaust gas that was cooled off under atmospheric pressure is compressed again, temperature rises due to adiabatic compression, thus it is necessary to be sufficiently cool off for circulating gas to compensate the rise of temperature when it cooled off under atmospheric pressure. Hence, this EGR system is suitable for an engine installed on a movable body with small space for installation such as vehicle. Although it is not always necessary to regulate the scavenging pressure to be identical to the supercharged pressure of the suction air, however, in order to draw fresh air into the scavenging air when opening a scavenging port valve 43B, the fourth embodiment intensifies the pressure of suction air to be higher than the pressure of the scavenging air.

The Fifth Embodiment

FIG. 5 is a PV diagram of an independent six-cycle diesel engine that is supercharged with 4 barometric pressure and equipped with a supercharger and a regenerator based on the fourth means for solving problems according to the present invention. The diagram explains variation of power output from a single six-cycle engine unit caused by difference in the regenerative pressure. The solid line illustrates a PV line chart of a single six-cycle engine unit when an ideal regenerative pressure is used. The dotted line illustrates a PV line chart when the regenerative pressure has been lowered than the ideal regenerative pressure. A compression stroke is initiated from the point D1 that designates a supercharged pressure. The point D2 is reached when pistons reaches upper dead center via adiabatic compression during compression stroke. When fuel injected into the combustion chamber has burnt, due to the combusted heat, the inner temperature rises, making the inner pressure rise up to the point D3. Even when an expansion stroke has been entered, as a result of the fuel injection into the combustion chamber, fuel is continuously burnt until the combustion is terminated at the point D3b. During fuel combustion, practical efficiency for replacing burnt gas with fresh air is higher when the regenerative pressure remains low, thus lowering gas temperature to make it possible to burn an increased volume of fuel. Therefore it is possible to raise pressure much higher in practice, however, for easier understanding, the graphic chart uses an identical pressure in the explosion and expansion strokes. Fuel combusted gas expands adiabatically during the expansion stroke. When exhaust fume expands up to the point D4, the exhaust valve opens.

After the point D4, the PV line separates into a solid line and a dotted line. The following explanation refers to the case of an ideal regenerative pressure shown by the solid line. In the case of an ideal regenerative pressure being used, even when the exhaust valve opens, pressure inside the fuel combustion chamber remain invariable. A piston expels exhaust gas under the ideal regenerative pressure until it reaches upper dead center or point D6. After individual pistons respectively start to descend, a scavenging valve opens itself at the point D7 at a later moment. The gas pressure remaining inside the fuel combustion chamber at the upper dead center corresponds to the regenerative pressure that is higher than the scavenging pressure, and thus, when the scavenging valve opens at the upper dead center, exhaust gas remaining in the fuel combustion chamber reversely flows to the scavenging port. Hence, a higher combustion efficiency and less noise generation can be secured by making exhaust gas expand inside the fuel combustion chamber. After the scavenging air comes into the fuel combustion chamber and the piston reaches the lower dead center, the introduction of scavenging air stroke is completed at point D1. Then the scavenging valve is closed and the introduced scavenging air begins to be compressed. The exhaust valve opens again at the point D8 to expel the scavenging air to be led to the exhaust port. Piston pushes the scavenging air to expel until it reaches the upper dead center point D6 under the regenerative pressure, the exhaust of scavenging air stroke ends, and the exhaust valve is closed. The piston starts to descend, and then, after a while, the suction valve opens itself at the point D7. The fresh suction air is admitted to cylinder and the piston reaches the lower dead center point D1, then the suction process ends and the suction valve is closed, and one cycle is completed.

The area surrounded by the points D1, D8, D2, D3, D3b, and D4, designates energy that is converted from combusted gas into rotational power of the above six-cycle engine during the compression stroke and the explosion/expansion stroke. However, since exhaust gas is expelled during the exhaust stroke and the introduction of scavenging air stroke, the energy shown by the area surrounded by the points D4, D6, D7, and D1, is taken from the engine rotating power. Further, energy shown by the area surrounded by solid lines interlinking the points D1, D8, D6, and D7, is taken from the engine rotating power during the exhaust of scavenging air stroke and the suction stroke. After erasing those areas corresponding to common portion, practical energy that can be output via single cycle of the six-cycle engine corresponds to the result of subtraction of an area that doubles the area surrounded by solid lines interlinking the points D1, D8, D6, and D7 from the area surrounded by solid lines interlinking the points D4, D8, D2, D3, and D3b.

Dotted line illustrates such a case in which the regenerative pressure is lowered to one half of the ideal regenerative pressure. When the exhaust valve opens, gas pressure inside the fuel combustion chamber lowers from the point D4 to the point D5 corresponding to the regenerative pressure by free expansion, and then, a piston pushes exhaust air to expel with the regenerative pressure before reaching the point D6b at the upper dead center. Then, the exhaust valve is closed and the scavenging valve is open at the point D7b at a time slightly later from the moment when the piston begins descending. When the piston reaches the lower dead center point D1, the introduction of scavenging air stroke ends, and the scavenging valve is closed. The scavenging air begins being compressed, The exhaust valve is again opened at the point D8b to expel the scavenging air to the exhaust port. Then, the piston pushes the scavenging air to expel with regenerative pressure, and then reaches the point D6b. Then, the piston begins to descend itself and at a time slightly later on, the suction valve is opened at the point D7b. When the piston reaches the lower dead center or point D1, the suction stroke ends, and the suction valve is closed, then one cycle is completed.

In the above case, the energy output from the six-cycle engine via single cycle corresponds to the result from a subtraction of the area that doubles the area surrounded by the solid lines and the dotted lines each interlinking the points D1, D8b, D6b, and D7b, from the area surrounded by the solid lines and the dotted lines each interlinking the points D5, D8b, D2, D3, D3b, D4, and D5. Calculation in the case of FIG. 5 shows that the power output from a single unit of the six-cycle engine rises by 35% when the regenerative pressure is reduced into one half. Practically, efficiency in the exchange of exhaust air with fresh air is higher when the regenerative pressure remains low. This in turn makes it possible to supply an increased volume of fuel, thus resulting in the enhanced power output from the six-cycle engine furthermore.

Figure 6:
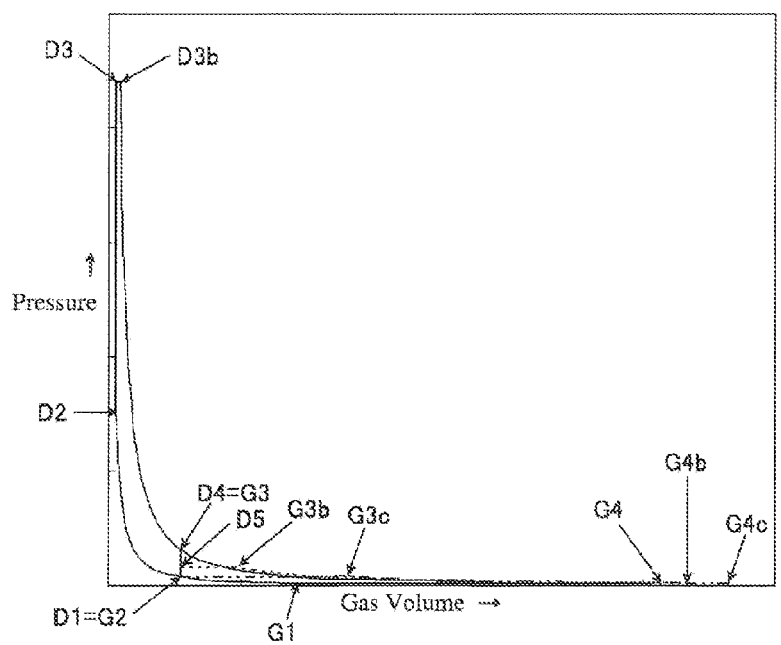
Figure 6:
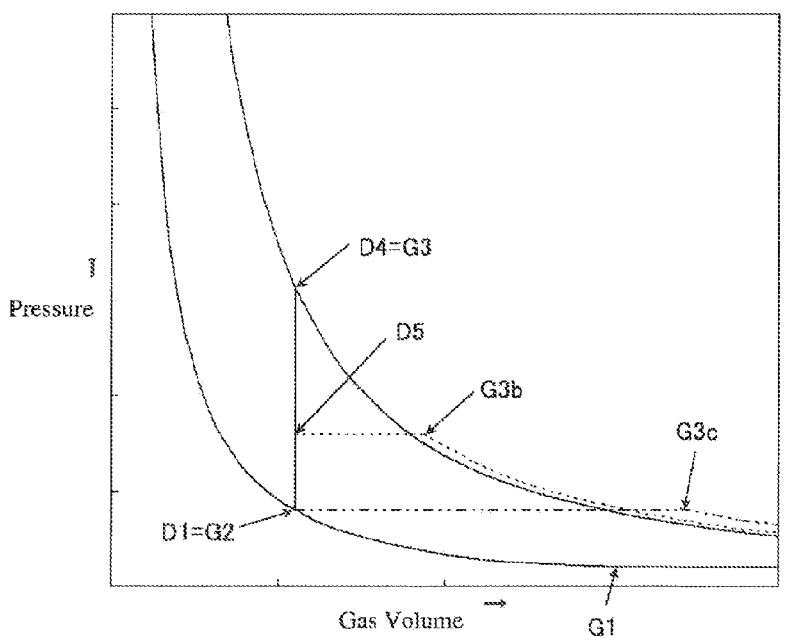

FIG. 6A is a PV diagram of the whole unit of the six-cycle engine including a supercharger and a regenerator cited above. FIG. 6B is an enlarged view in the periphery of the original point. Fresh air fed into the supercharger at the atmospheric pressure G1 is then supercharged and turned into the pressure G2. The six-cycle engine draws the supercharged fresh air at the pressure corresponding to the point D1, and then, after passing through the process described in reference to FIG. 5, the exhaust valve opens itself at the point D4. To indicate variation that occurred later on, FIG. 6A presents a PV line chart comprising a solid line, a dotted line, and a two-dot chained line. The solid line is of the case of using the ideal regenerative pressure that corresponds to the solid-line graphic chart shown in FIG. 5. Exhaust gas expelled from the six-cycle engine at the pressure shown at the point D4 directly becomes the pressure G3 at the inlet of the regenerator, which is then subject to a adiabatic expansion continuously inside the regenerator before being exhausted to the atmosphere at the atmospheric pressure G4.

The regenerator collects the energy required in the course of the introduction of scavenging air stroke and the exhaust of scavenging air stroke by directly converting the above energy into the rotating energy, and thus, this energy is not shown in FIGS. 6A and 6B. Actually, a larger volume of gas flows into the regenerator because of the above reason, resulting in lower gas temperature. As a result, the energy to be output from the whole unit of the engine per cycle is designated by an area surrounded by solid lines interlinking the points G1, D1, D2, D3, D3b, D4, and G4.

The dotted line corresponds to the case of the dotted line shown in FIG. 5. In the course of opening the exhaust valve, gas inside the fuel combustion chamber freely expands up to the regenerative pressure G3b. Since the extent of the lowered temperature is less than the case in which gas adiabatically expands from the ideal regenerative pressure while doing work inside the regenerator, actual volume at the above pressure is greater than the case in which gas expands inside the regenerator at the ideal regenerative pressure, thus causing the point G3b to be positioned to the right of solid line. Exhaust gas expelled from the six-cycle engine by the pressure at the point D5 directly becomes the pressure G3b at the inlet of the regenerator, and then, the exhaust gas is subject to adiabatic expansion continuously inside the regenerator before being exhausted to the atmosphere at point G4b at atmospheric pressure. The energy that can be output per cycle is designated by an area surrounded by solid lines interlinking the points G1, D1, D2, D3, D3b, D4, D5, G3b, and G4b.

The energy (corresponding to the area on the left side of a dotted line interlinking the point G3b with the point G4b) that can be regenerated by the regenerator is less than the case (an area on the left side of a solid line interlinking the point G3 with the point G4) of the ideal regenerative pressure. However, due to the growth of power output from the six-cycle engine, there is merely a slight difference in the overall efficiency by approximately 2%, and thus, this cycle is fully workable on the industrial basis. This is because that since the freely expanded pressure energy is not simply released, but the released energy has merely been converted into gas thermal energy, thus it is possible to regenerate much of the gas thermal energy via a regenerator. Since it is possible to vary the proportion between the power output from a single unit of the six-cycle engine and the power output from the regenerator with less variation of efficiency of the thermal cycles between the solid line and the dotted line, the six-cycle engine with a regenerator has an advantage when being required to independently control the power output from a couple of output shafts.

Two-dot chained line shows the PV line chart in the case in which a regenerative pressure is identical to a supercharging pressure. The decline of the overall efficiency caused by variation of the regenerative pressure is proportional to a quadric against the difference from the pressure based on a maximum efficiency. Practically, when exhaust gas has been expanded freely up to the above range, overall efficiency will be lowered by 11%. However, in such a vehicle having a high running performance capability, actual load at cruising speed is considerably lower than full load, so it is not necessarily denied for industrial applicability to use such pressure value as set pressure of a regenerator for full load condition. This is because, using the ideal regenerative pressure in a frequently used cruising range may practically improve specific fuel consumption even if the specific fuel consumption worsens under full load conditions which is less frequently used. Actually, even in the PV line chart with two-dot chained line, since it is possible for the regenerator to generate such an output power that exceeds the power capable of rotating a supercharging turbine, practical efficiency of the six-cycle engine according to the present invention becomes considerably higher than that is shown in the PV line chart of a four-cycle diesel engine provided with a turbocharger that has no electricity generating function.

Conversely, the regenerative pressure also can be set at a value slightly higher than the inner pressure of cylinder which is the pressure when the exhaust valve of the above six-cycle engine is opened. However this can be done provided that problems such as melting loss of the exhaust valve do not occur. In case where the whole engine unit is used with an extremely low load such a case as an auxiliary machinery connected to turbine needs power with zero output from the six-cycle engine such as in an idling condition, such pressure setting may be considerable one.

Figure 7:
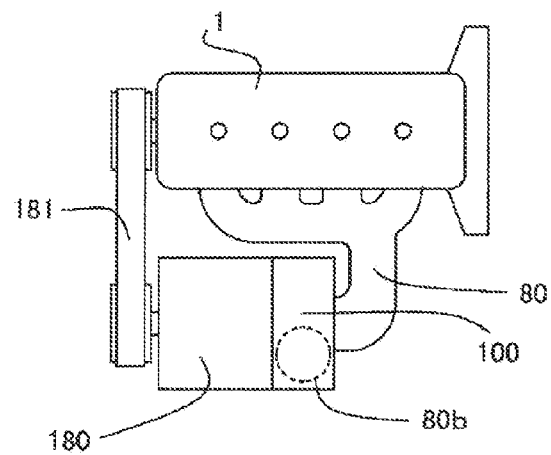
FIG. 7 is a simplified schematic block diagram of a six-cycle engine related to the first embodiment based on the fourth means for solving problems according to the fifth embodiment of the present invention.

FIG. 7 is a schematic block diagram that illustrates the first embodiment of the present invention based on the fourth means for solving problems. In this embodiment, a scrolling type displacement type expander functioning as a regenerator 100 is secured to an exhaust manifold 80 of a six-cycle engine 1. Power output from the regenerator 100 is transmitted to the six-cycle engine 1 via a transmission 180 and a power transmitting belt 181. Referring to FIG. 7, a dotted-line circle drawn in the regenerator 100 designates the exhaust manifold 80*b* that is disposed below thereof and emits exhaust gas from the expander. When the transmission 180 remains at the least ratio, the six-cycle engine adopts the ideal regenerative pressure. When the ratio of the transmission 180 becomes bigger, gas volume drawn by the regenerator 100 increases by more than the volume of exhaust gas expelled by the six-cycle engine. When an exhaust valve of the six-cycle engine opens, exhaust gas freely expands, and then turns into such a regenerative pressure lower than the ideal regenerative pressure.

Even when replacing the transmission 180 and the power transmitting belt 181 with an electric generator, since it is possible to vary the rotational number of the generator by controlling the generating capacity via an external source, an identical effect can be secured.

Because a scrolling type displacement type expander is used as a regenerator, the gas expansion ratio inside the expander becomes a steady value. It is therefore preferable not to vary the regenerative pressure from the viewpoint of stabilizing practical efficiency of the regenerator and the exhaust noise. Hence, it is so arranged that the transmission be held by bigger ratio while fully being loaded so as to provide the regenerative pressure to be lower than the ideal regenerative pressure as shown by the dotted line in FIG. 6. Conversely, when partial load is applied, operating ratio of the transmission is smaller so that exhaust gas can be regenerated by applying the ideal regenerative pressure.

The Sixth Embodiment

Figure 8:
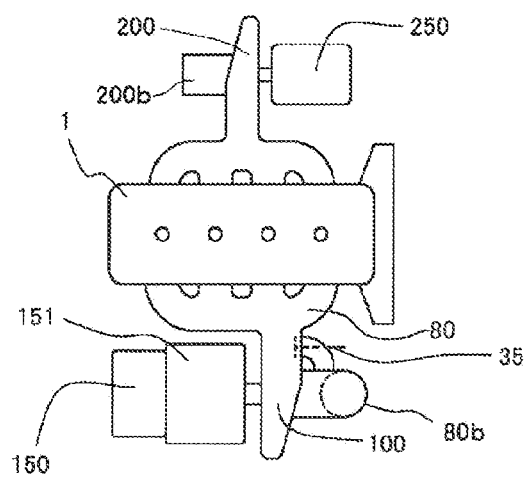
FIG. 8 is a simplified schematic block diagram of the six-cycle engine related to the second embodiment based on the fourth means for solving problems according to the sixth embodiment of the present invention.

FIG. 8 is a schematic block diagram that illustrates the second embodiment of the present invention based on the fourth means for solving problems. An exhaust manifold 80 of the six-cycle engine 1 is provided with a turbine-type regenerator 100 that drives an electricity generator 151 and an auxiliary unit 150 that are respectively disposed coaxially. Using a variable vane type turbine or a turbine with variable number of nozzles make it possible to control an overall area of nozzles, thereby properly controlling the regenerative pressure. By controlling the overall area of nozzles into a proper extent in proportion to the volume of exhaust gas emitted from the six-cycle engine, it is possible to constantly maintain the regenerative pressure at a value close to that of the ideal regenerative pressure. As a matter of course, by intentionally controlling the regenerative pressure so as to further expand the aperture area of nozzles, it is possible to properly drive the six-cycle engine with a regenerative pressure lower than the ideal regenerative pressure.

Further, a waste gate valve 35 is secured to the exhaust portion of the six-cycle engine so as to release exhaust gas into the atmosphere. When the waste gate valve 35 is operated, operating efficiency is lowered. However, it makes it possible to momentarily raise the power output from the six-cycle engine to the maximum extent. Even when the pressure at the inlet of the above regenerator is provisionally lowered, if the descending period merely lasts for a short period, it is possible to maintain the rotating speed of the turbine by temporarily lowering load torque held by the power generator. This system can be applied to such a case in which it is desired to quickly raise the rotational number of the six-cycle engine so as to boost an overall power output from this engine because of its less time lag in accelerating.

This system is advantageous for use as a motor for driving such a movable object such as a vehicle having a greatly variable load.

In the present embodiment, the six-cycle engine 1 is equipped with a supercharger 200 that is driven by a motor 250, in which the supercharging pressure can be controlled via an external source. So it is arranged that the power to be output from the whole system can be controlled by supercharged pressure.

When regenerating the regenerative pressure with a single or double stage gas turbine, if it is aimed at enhancing the cycle efficiency, it is necessary for the gas turbine to deal with such a flow velocity in excess of the acoustic velocity. In this case, it is essential to form such a diverging nozzle shape for the turbine in which sectional area thereof is reduced once so as to form the throat portion before eventually expanding the sectional area. In this case, if the gas excessively expands or insufficiently expands at the throat portion, the gas turbine operating efficiency is quickly worsened, and thus, it is necessary to use the pressure ratio between the inlet and the outlet of the turbine according to the designed value. Since the turbine according to the present embodiment deals with the supersonic, it is so controlled that a constant regenerative pressure can remain being lower than the ideal regenerative pressure when fully being loaded. Hence, there is such an advantageous effect capable of constantly maintaining the engine operating efficiency at a high degree while simplifying the regenerating system.

The Seventh Embodiment

Figure 9:
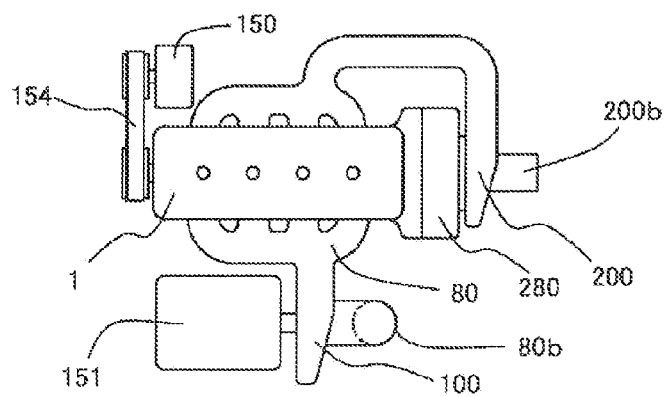
FIG. 9 is a simplified schematic block diagram of a six-cycle gas turbine according to the seventh embodiment of the present invention.

FIG. 9 is a schematic block diagram of a six-cycle gas turbine according to the seventh embodiment of the present invention based on the fifth means for solving problems. In the present embodiment, the power output from a six-cycle engine 1 drives a supercharger 200 that is a turbine-type compressor via an accelerator 280 and also drives an auxiliary unit 150 via a belt 154. Majority of the power is output from a turbine 100 functioning as a regenerator, and then converted into electric power by an electric generator 151.

The Eighth Embodiment

Figure 10:
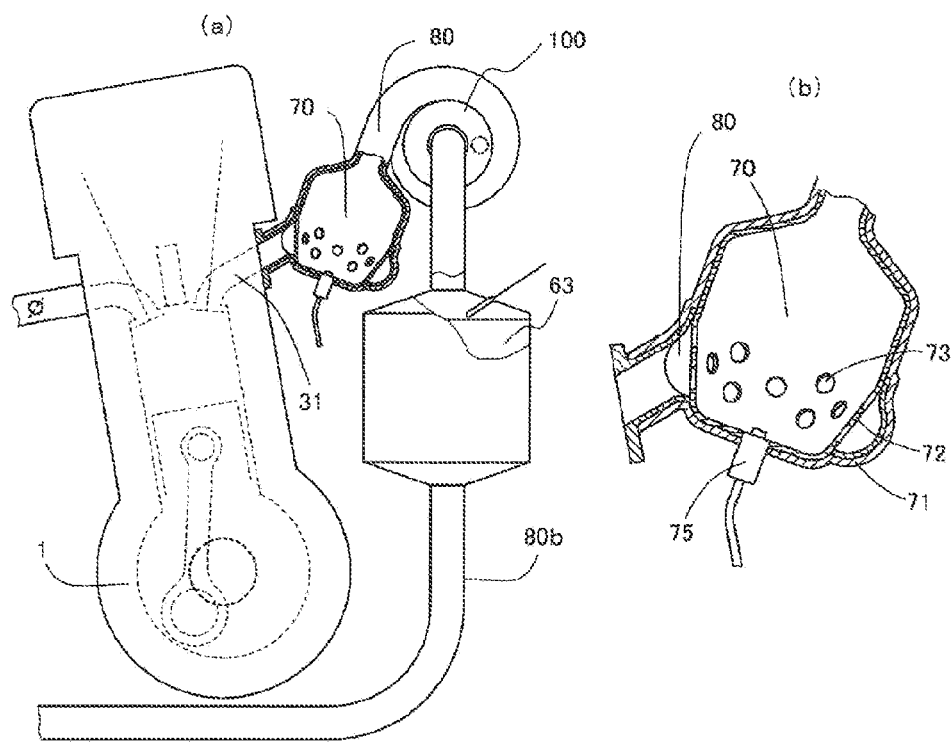
FIG. 10a is a lateral view of an engine that is provided with a combustion chamber formed in an exhaust manifold related to the present invention.
FIG. 10b is an enlarged view of the combustion chamber according to the eighth embodiment of the present invention.

FIG. 10 is a lateral view of a six-cycle engine provided with multiple cylinders disposed in series, which is further provided with a combustion chamber (based on the seventh means for solving problems) that is disposed inside an exhaust manifold 80 based on the third means for solving problems. The combustion chamber 70 is disposed inside the assembled portion of the exhaust manifold 80 linked with exhaust ports 31 of individual cylinders disposed inside the six-cycle engine. Including external periphery of an exhaust turbine, the exhaust manifold 80 provided with the combustion chamber 70 therein is fully covered with heat insulating material 71. The inner surface of the exhaust manifold 80 is covered with heat insulating coating material. A regenerator 100 is linked with the down-stream side of the combustion chamber 70, and further, an exhaust catalyst unit 63 is disposed inside the other exhaust manifold 80*b* set to the down-stream portion of the regenerator 100.

An inner wall 72 with a plurality of gas-passing through holes 73 is formed inside the combustion chamber 70. The combustion chamber 70 intermixes exhaust gas generated via fuel combustion with scavenging exhaust gas incoming alternately, and then combusts unburned gas. In order to generate the combustion, it is necessary for the inner space of the inner wall 72 of the combustion chamber 70 to have such a capacity at least corresponding to the volume of exhaust gas corresponding to one cycle of a cylinder. A fuel injecting port of a fuel feeder 75 is disposed inside the combustion chamber 70, which feeds fuel to the combustion chamber 70 as required.

Simultaneously with a supply of fuel, it is converted into combustible gas by the inner heat of the combustion chamber 70, and then mixed with residual oxygen present in the exhaust gas before generating combustion. In order to prevent thermal damage from occurrence, the fuel feeding unit is disposed projecting downward.

The Ninth Embodiment

Figure 11:
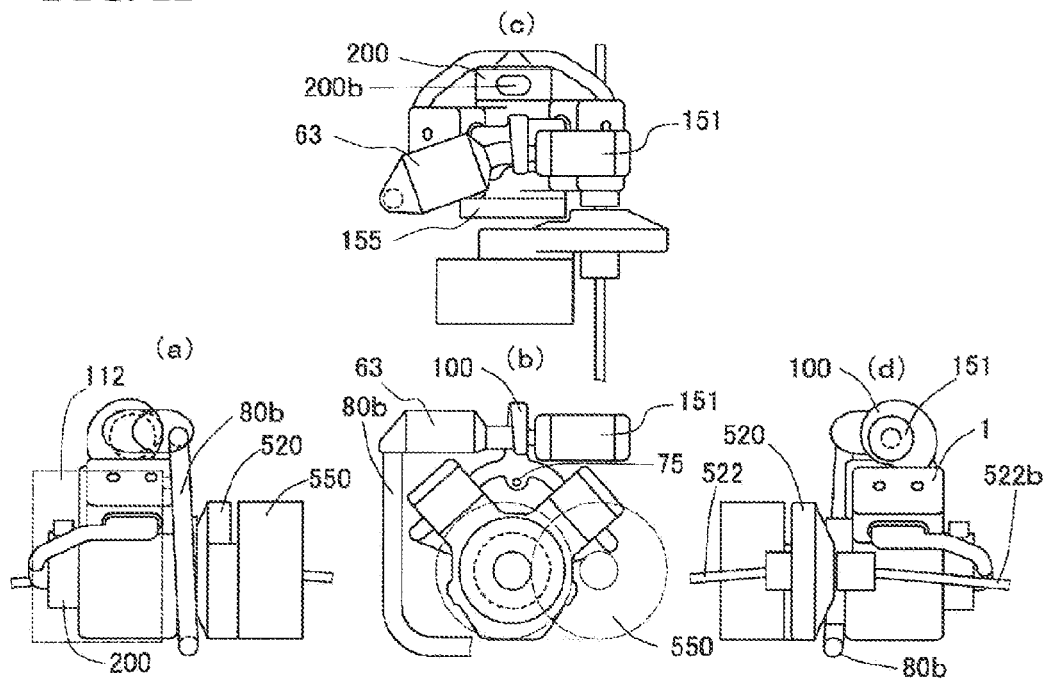
FIG. 11 is a four orthogonal view of the power unit provided for a front-wheel drive vehicle according to the ninth embodiment of the present invention.

FIG. 11 is a four orthogonal view of a power plant mounted on a hybrid system FF (Front-engine Front-drive) vehicle provided with a laterally disposed engine based on the ninth and eleventh means for solving problems according to the present invention. The six-cycle engine conforms to the engine that has introduced the third, sixth, and the seventh means for solving problems related to the present invention. FIG. 11A is a front view of the power plant as seen from the front of the above-referred vehicle. FIG. 11B is a lateral view thereof. FIG. 11C is an upper-surface view thereof. FIG. 11D is a rear view thereof.

The six-cycle engine 1 is a 90-degree V-shaped four-cylinder engine that is independently provided with a scavenging air port and an suction port therein. The six-cycle engine 1 is further provided with a scrolling type displacement type compressor 210 as a supercharger that is directly linked with a crank shaft. The supercharger 210 feeds intake fresh air to the suction port of the six-cycle engine with a stable pressure by such a volume proportional to the rotational number of the above six-cycle engine. Since the compression ratio of the above displacement type compressor 210 is in the range from two to three, this in turn makes it possible to compactly configure the six-cycle engine. Actual supercharging pressure rises higher than said value of the compression ratio because of increased temperature due to adiabatic compression.

The 90-degree V-shaped four cylinder six-cycle engine is disposed in the direction slightly inclined backwards. A combustion chamber 70 equipped with a fuel feeder 75 is disposed in a portion assembled with a specific number of thermally insulated exhaust manifolds extended from exhaust ports of individual cylinders. A regenerator 100 that is a turbine with variable number of nozzles is disposed above the combustion chamber 70. An electric generator 151 is secured to an output shaft of the regenerator 100 in order to convert the power output from the six-cycle engine 1 into electric power. Then, exhaust gas is led to an exhaust-catalyst unit disposed in a forward location. Exhaust gas is then led in the downward direction in front of the six-cycle engine, and then led in the backward direction along the bottom surface of the vehicle chassis. The ninth embodiment provides an EGR system that corresponds to the one introduced for the third embodiment. After flowing from the upper-stream portion of the catalyst, exhaust gas circulates around the catalyst so as to maintain inner temperature thereof, the exhaust gas is cooled off by a cooling device 112 of the EGR system corresponding to one-point chained line shown in FIG. 10a, and then led to a scavenging port of the six-cycle engine 1.

An electric generator that also serves as a motor 155 functioning as an auxiliary unit is directly secured to the output shaft of the six-cycle engine 1. Availing of surplus power output from the six-cycle engine, electric power is generated by the generator 155, which is then stored in a battery in combination with electric power generated by another generator 151. The electric power is used for driving a motor 550 for driving the vehicle. The engine power is mainly output from the above-referred regenerator 100. Since the six-cycle engine merely drives the supercharger 200 as an auxiliary unit and the motor 155 that also serves as a generator, this operating system is regarded as a kind of a six-cycle gas turbine. The vehicle mounted with the six-cycle engine converts the power output from the motor 155 into a proper rotational number via a transmission gear 520, which enables the vehicle to run by driving the front wheels via a couple of drive shafts 522 and 522b. In FIG. 10b, the motor 550 and the transmission gear 520 are designated with one-point chained line, respectively.

In a conventional series-type hybrid vehicle, due to large dimensions of the vehicle driving motor 550, it has been quite difficult to laterally mount an engine on a vehicle that is driven with the front wheels. However, the power plant according to the ninth embodiment of the present invention enables to contracts the width of the engine via the method of supercharging and arranging the engine configuration into the V-shape. Further, the power generator 155 can be designed to have its shorter width because it is only necessary to secure such a torque required for starting the engine. These means make it possible to further mount the vehicle-driving motor 550 along the power generating motor 155. Another power generator 151 features the high rotational number and is capable to be configured with compact dimensions. So this power plant can advantageously be used for any of compactly built cars.

Figure 12:
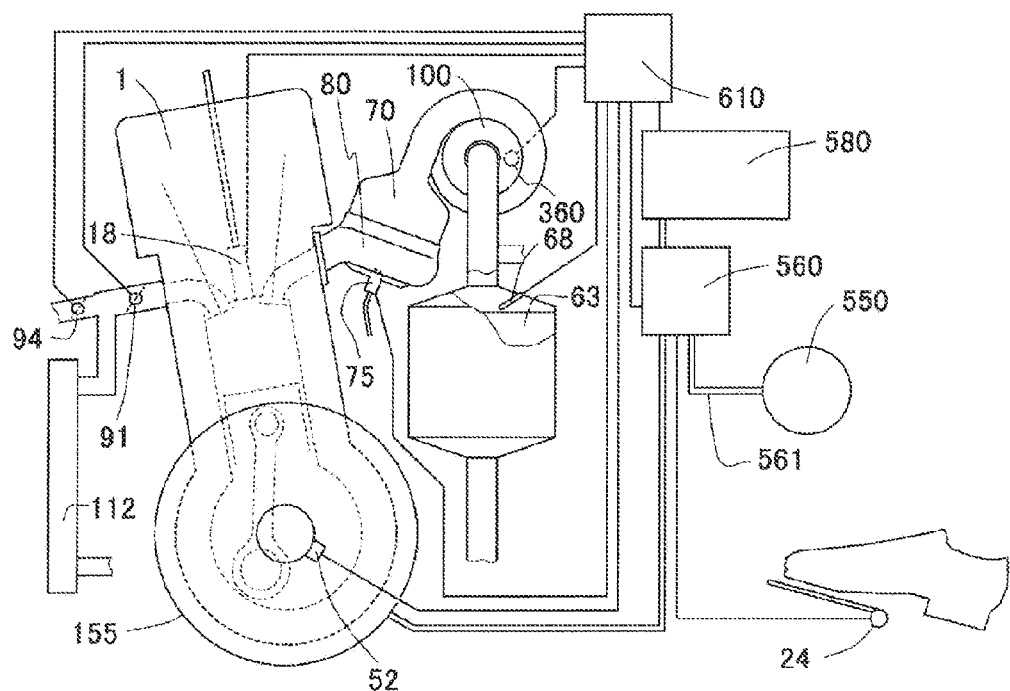
FIG. 12 is a schematic block diagram of the controlling system for controlling the power unit according to the ninth embodiment of the present invention.

FIG. 12 is a diagram of the controlling system according to the ninth embodiment of the present invention. For easier understanding, the portions of the six-cycle engine are illustrated by an open-sided bank. The vehicle-driving motor 550 is driven by a motor controller 560 in conformity with an accelerator sensor 24 so that the vehicle can properly be subject to acceleration and deceleration.

Controlling computer 610 has a means for sensing the actually charged volume of DC power stored in a battery 580 and a function for operating a rotary actuator 360 that rotates a switching valve for varying the number of nozzles provided for a turbine with variable number of nozzles. By referring to an actually charged volume stored in a battery being detected, the controlling computer 610 determines the rotational number of the six-cycle engine 1 required for determining a practical volume of DC power to be generated. By mainly controlling the number of nozzles built in the exhaust turbine, the controlling computer 610 varies the regenerative pressure and properly controls the rotational number of the six-cycle engine 1. When an overall area of the built-in nozzles is expanded, based on the principle described in reference to the embodiments 5 and 6, the regenerative pressure is lowered to cause the power output from the six-cycle engine to be increased, thereby increasing the rotational number of the six-cycle engine resulting in the enhanced power output from the whole engine unit.

In order to more precisely control the power output from the six-cycle engine, initially, the controlling computer 610 controls a motor controller 560, and then, availing of a specific rate of power generated by the power generator 155 that concurrently serves as a motor, the actual load borne by the six-cycle engine is varied so as to properly regulate the rotational number thereof. The ninth embodiment does not use a throttle valve. If it is no longer necessary to generate power, the controlling computer 610 suspends further supply of fuel, and then boosts the actual load applied to the motor 155 to terminate operation of the six-cycle engine. Re-start of the six-cycle engine is also executed by the power generator that concurrently serves as the motor 155.

Further, the controlling computer 610 has a means for sensing signal output from an exhaust sensor 68 for sensing actual condition of the built-in catalyst. The controlling computer 610 also has means for operating an actuator 91 that individually opens and closes the second valve and a scavenging port valve respectively secured to the scavenging port and a scavenging port valve actuator 94. By referring to a specific value detected from the exhaust sensor 68, if it is identified that exhaust gas has a high degree of temperature, the actuator 91 opens the second valve so as to increase the exhaust gas volume. If it is identified that oxygen has a higher density, the scavenging port valve is operated in the direction of the closed position. It is also possible to simultaneously increase the volume of fuel being supplied from a direct injector of the six-cycle engine. If the six-cycle engine were in the thermally critical condition while the second valve remains fully being open, then, it is so arranged that the actual density of oxygen can be lowered by feeding fuel to the combustion chamber located in the exhaust port from a fuel feeder 75.

The Tenth Embodiment

Figure 13:
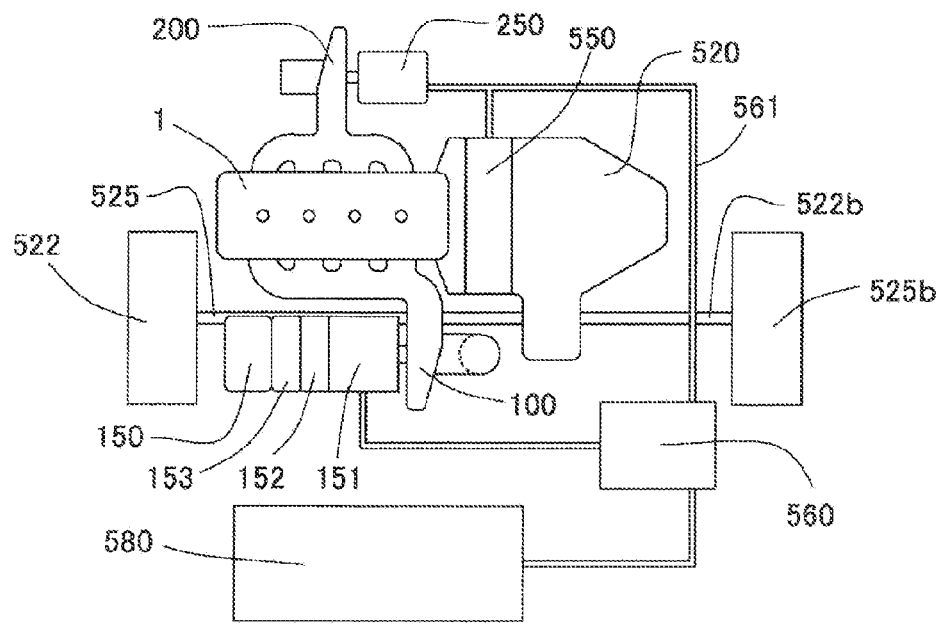
FIG. 13 is a power system for driving a parallel hybrid vehicle according to the tenth embodiment of the present invention.

FIG. 13 is a schematic block diagram of a motive power system built in a movable body based on the eighth means for solving problems according to the present invention. The reference numeral 1 designates a six-cycle engine provided with a regenerator, wherein the six-cycle engine comprises four cylinders disposed in series and is equipped with a supercharger 200. In the tenth embodiment, a gas turbine has been introduced so as to function as a regenerator 100. The power output from the regenerator 100 is converted into electric power by an electric generator 151, and then, the electric power is further converted into a proper voltage and a proper frequency suitable for driving a vehicle driving motor with a motor controller 560, which is then converted into a driving power via a motor 550 and then further converted into a proper rotational number via a transmission gear 520. The driving power with a proper rotational number of the motor 520 is then transmitted to a couple of driving wheels 525 and 525*b* via a couple of drive shafts 522 and 522*b*. The output shaft of the six-cycle engine 1 is also connected to the motor 550. The power output from the six-cycle engine 1 is transmitted to the drive shaft via the transmission gear 520 in combination with the power output from the motor.

The six-cycle engine 1 is provided with a supercharger 200 that is driven with a motor 250, in which the rotational number of the supercharger 200 is controlled by the motor controller 560 in accordance with the instructions of the operator. The motor controller properly controls the power output from the six-cycle engine by applying the supercharging pressure. A portion of the power output from the regenerator drives an auxiliary unit 150 such as a compressor of an air conditioner operated via a speed reduction gear 152 and a clutch 153. Because of this embodiment being for a vehicle, a battery 580 is installed. Since the battery only needs such an energy just enough to accelerate the supercharger 200, it is not always necessary to provide the battery with a size appropriate for a hybrid vehicle.

Since it is possible to store DC electric power in a battery 580 when an excessive volume of the power has been generated and also possible to compensate for the shortage with the power stored therein, it is possible to compensate for any difference in the power output from the six-cycle engine that has occurred for any reason and also compensate for provisional shortage of the driving power during the rise of the supercharging pressure. Similar to the embodiments cited in FIGS. 8, 9, 10, and 11, it is possible for the gas turbine functioning as the regenerator 100 to be held at an efficient and proper rotational number constantly by properly controlling the volume of DC power generated by the electric generator 151 secured to the regenerator 100 via the motor controller 560. When it is desired to suspend the six-cycle engine when stopping or driving the vehicle at a low speed or regenerate the running energy, by enlarging the capacity of the battery 580, practical effect of the hybrid vehicle can be promoted further.

According to the six-cycle engine of the tenth embodiment of the present invention, since auxiliary unit is driven by a regenerator, it is no longer necessary to provide the drive belt 154 shown in FIG. 9 otherwise needed for driving the auxiliary unit. This in turn enables the total length of the six-cycle engine 1 to be contracted proportionally, thereby proving such an advantage capable of securing enough space for accommodating the motor 550 for driving a hybrid vehicle therein.

Instead of providing the speed reduction gear 152 introduced to the tenth embodiment of the present invention, by driving another motor for driving an auxiliary unit with the electric power generated by the electric generator 151, it is possible to achieve an identical object. Replacing the motor 550 and the transmission gear 520 adopted for the tenth embodiment with such a hybrid system that incorporates individual characteristics of the series type and the parallel type cited in the Japanese Patent document 6, also make it possible to suspend the six-cycle engine being driven and improve practical fuel cost economy further.

The Eleventh Embodiment

Figure 14:
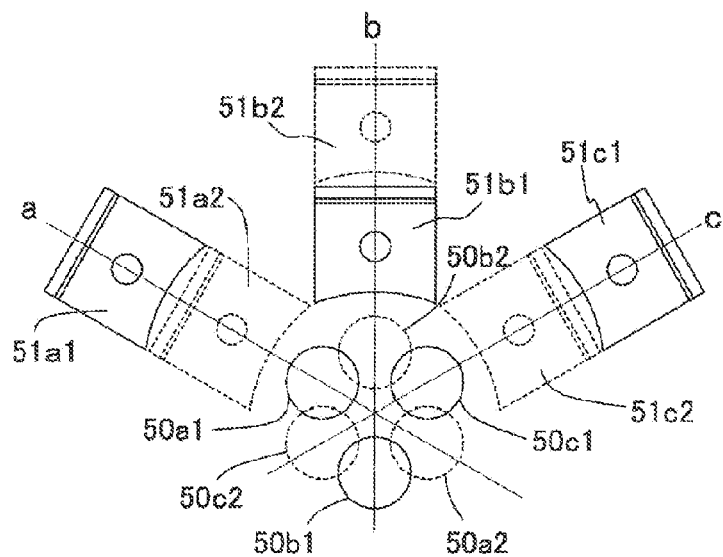
FIG. 14 is a crank-pin disposition diagram provided for a W-type six-cylinder engine according to the eleventh embodiment of the present invention.

FIG. 14 is a schematic block diagram that illustrates the disposed direction of cylinders built in a six-cylinder engine provided with W-shaped six cycles and also illustrates the crank pins disposed therein. One-dot chained lines a, b, and c respectively designate the center lines inside the three cylinder blocks that are arranged into the W shape. The reference numeral 51 designates a piston that reciprocates inside an individual cylinder via sliding. The pistons 51*a*1, 51*b*1, and 51*c*1 designated by solid lines individually correspond to the crank pins disposed in a single unit of the W-shaped bank, where the crank pins are respectively designated at positions that correspond to the positions of individual pins 50*a*1, 50*b*1, and 50*c*1. Those crank pins 50*a*2, 50*b*2, and 50*c*2 and those pistons 51*a*2, 51*b*2, and 51*c*2, respectively being designated by dotted lines respectively show the position of the other unit of the W-shaped bank. The positions of the crank pins disposed against a couple of pistons present in a single cylinder block are 180 degrees out of phase, making a six-cycle engine having 180 degree equal interval combustion with primary balance including the moment of inertia.

The number of the bearing provided for an individual crank is set to be three bearings that are disposed on both sides for three crank pins per unit of the W-shaped bank or alternatively four bearings that are disposed per couple of crank pins upon consideration of the rigidity and strength of individual cranks. In contrast with the six-cycle engine that constitutes the motive power source of the FF vehicle shown in FIG. 11, the above six-cycle engine consisting of the W-shaped six cylinders according to the eleventh embodiment is provided with a constant length in the direction of the vehicle width, and yet, the above six-cycle engine is replaceable.

Industrial Applicability

The above six-cycle engine provided with a regenerator according to the present invention is extensively applicable to every end-use that requires an internal combustion engine with improved fuel cost economy.

The primary object of the present invention is to ensure an effective utilization of residual energy remaining in the exhaust gas discharged from a displacement type engine via regeneration of the exhaust gas in a simple way, thereby contributing to improve the fuel cost economy. In particular, the invention advantageously suppresses noise generated from exhaust gas. The six-cycle engine with a regenerator does not cause the working efficiency to lower even when being supercharged with a relatively high pressure and is capable of generating substantial advantage from the compact configuration in the exhaust gas supercharging process. Further, since it is possible to vary the proportion of power output from the 6-cycle engine and the regenerator, availing of this principle, it is possible to utilize the invented 6-cycle engine as the one that drives a couple of output shafts. Further, the invented 6-cycle gas turbine is also available as a gas turbine with easy controllability.

When using the above gas turbine as a regenerator, there is such an advantage that enables a power plant including an electric generator to be compactly configured in the practical use of electric generation in particular. In the field of application of a large engine, such a large engine is applicable to any of movable bodies such as ships, highway express buses, large trucks, conventional vehicles as well as electric power plant. Such specific characteristics of the six-cycle engine as being capable of generating internal cooling effect enables cooling system to be simplified, and overall electricity generating system therefore can be configured compactly. The above practical effect signifies that the six-cycle engine with a regenerator embodied by the present invention has high potentials of applicability for the power source of hybrid vehicles on the increase in its use.

The invention claimed is:

1. A six-cycle engine with regenerator comprising:
   a fuel combustion cylinder;
   a combustion chamber disposed inside an exhaust manifold between the fuel combustion cylinder and the regenerator; and
   a fuel feeder which feeds fuel to the combustion chamber so that the fuel burns in the combustion chamber by a heat of exhaust gas emitted from the fuel combustion cylinder.

2. A movable body being equipped with an internal combustion engine according to claim 1.

3. The six-cycle engine of claim 1, wherein the regenerator comprises a gas turbine through which the exhaust gas emitted from the combustion chamber passes.

4. A six-cycle engine and a combined type internal combustion engine extracting power output from the exhaust of said six cycle engine to outside of said six cycle engine (hereinafter referred to as a six-cycle engine with regenerators), total aperture angle of said six-cycle engine being narrowed and timing of the exhaust valve of said six-cycle engine being delayed during scavenging air exhaust stroke more than during exhaust stroke.

5. A movable body being equipped with an internal combustion engine according to claim 4.

6. The internal combustion engine according to claim 4, further comprising: a supercharger being disposed at the suction port of said six-cycle engine; and a gas turbine being used as a regenerator and disposed at the exhaust port of said six-cycle engine, said gas turbine extracting a majority of output power.

7. A movable body being equipped with an internal combustion engine according to claim 6.

8. The internal combustion engine according to claim 4, further comprising: a motor generator disposed to the output shaft of said six-cycle engine; a plurality of exhaust gas turbines functioning as regenerators; and a mechanism for varying the total area of the nozzles of said exhaust gas turbines, said exhaust gas turbines having no throttle valve.

9. A movable body being equipped with an internal combustion engine according to claim 8.

10. A six-cycle engine with regenerator, comprising:
    a fuel combustion cylinder having a scavenging port, a suction port, and an exhaust port which emits exhaust gas to the regenerator, the scavenging port being independent of the suction port; and
    a system for circulating a large portion of the exhaust gas emitted from the regenerator to the scavenging port,
    wherein the regenerator comprises a gas turbine through which the exhaust gas passes.

11. A movable body being equipped with an internal combustion engine according to claim 10.

12. The six-cycle engine of claim 10, further comprising:
    a combustion chamber installed between the exhaust port and the regenerator; and
    a fuel feeder which feeds fuel to the combustion chamber so that the fuel burns in the combustion chamber by a heat of the exhaust gas.

13. The six-cycle engine of claim 10, further comprising a transmission connected to the gas turbine.

14. The six-cycle engine according to claim 10, further comprising a supercharger being installed in communication with the suction port.

15. A movable body being equipped with an internal combustion engine according to claim 14.

16. The six-cycle engine according to claim 14, further comprising: a plurality of regenerators being disposed in communication with the exhaust port; and a gas passage for circulating the exhaust gas led from the passage interlinked between the plurality of regenerators to the scavenging port.

17. A movable body being equipped with an internal combustion engine according to claim 16.

* * * * *